US011954390B2

(12) United States Patent
Morales

(10) Patent No.: US 11,954,390 B2
(45) Date of Patent: Apr. 9, 2024

(54) PRINTING SYSTEM FOR PEER-TO-PEER OUTPUT MANAGEMENT

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 143 days.

(21) Appl. No.: 17/571,786

(22) Filed: Jan. 10, 2022

(65) Prior Publication Data

US 2023/0221909 A1 Jul. 13, 2023

(51) Int. Cl.
*G06F 3/12* (2006.01)

(52) U.S. Cl.
CPC .......... *G06F 3/1291* (2013.01); *G06F 3/1203* (2013.01); *G06F 3/1231* (2013.01); *G06F 3/1261* (2013.01); *G06F 3/1262* (2013.01)

(58) Field of Classification Search
None
See application file for complete search history.

(56) References Cited

U.S. PATENT DOCUMENTS

| | | | |
|---|---|---|---|
| 7,339,704 B2 | 3/2008 | Mestha et al. | |
| 7,413,175 B2 | 8/2008 | Levine et al. | |
| 7,420,699 B2 | 9/2008 | Farrell et al. | |
| 7,973,947 B2 | 7/2011 | Mazur et al. | |
| 9,170,758 B2 | 10/2015 | Morris et al. | |
| 11,556,294 B1 * | 1/2023 | Morales | G06F 3/1204 |
| 2004/0158654 A1 * | 8/2004 | Shima | G06F 3/1285 710/8 |
| 2006/0176498 A1 * | 8/2006 | Wada | G06F 3/1253 358/1.13 |
| 2007/0064266 A1 * | 3/2007 | Yamauchi | G06F 3/1222 358/1.14 |
| 2019/0026053 A1 * | 1/2019 | Arakawa | G06F 3/1259 |
| 2021/0365219 A1 * | 11/2021 | Hidaka | G06F 3/1256 |

* cited by examiner

*Primary Examiner* — Eric A. Rust
(74) *Attorney, Agent, or Firm* — Millen, White, Zelano & Branigan P.C.; William F. Nixon

(57) ABSTRACT

A peer-to-peer network of printing devices is configured to share printing device information, such as job queue status, configuration information, and resource information for automated load balancing, capability matching, failover, and print splitting operations. A digital front end (DFE) of a printing device establishes connections with the DFEs of other printing devices to manage output within the peer-to-peer network in an automated manner. When a print job is received at a DFE for a printing device, it is evaluated to determine how to best manage the output for the print job.

12 Claims, 18 Drawing Sheets

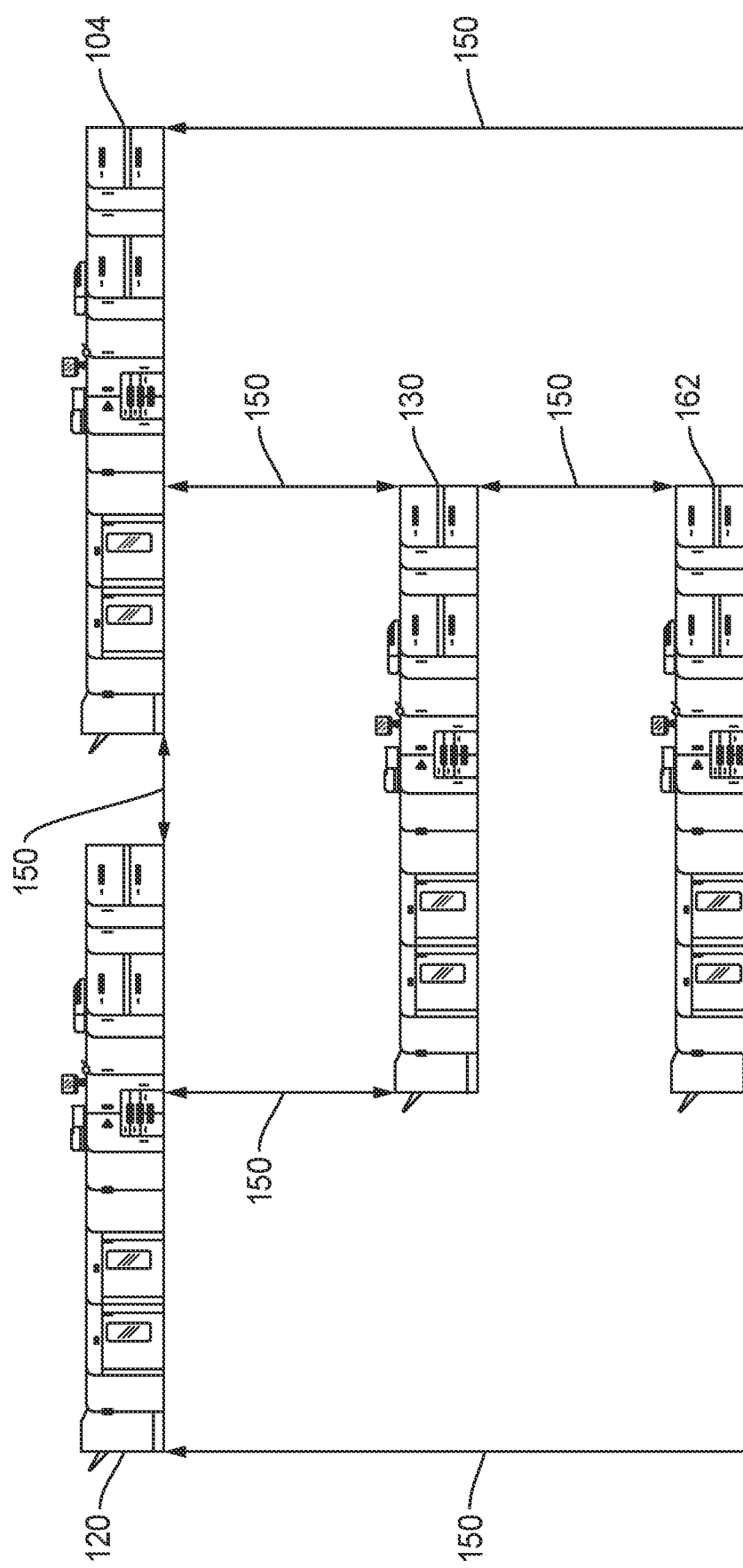

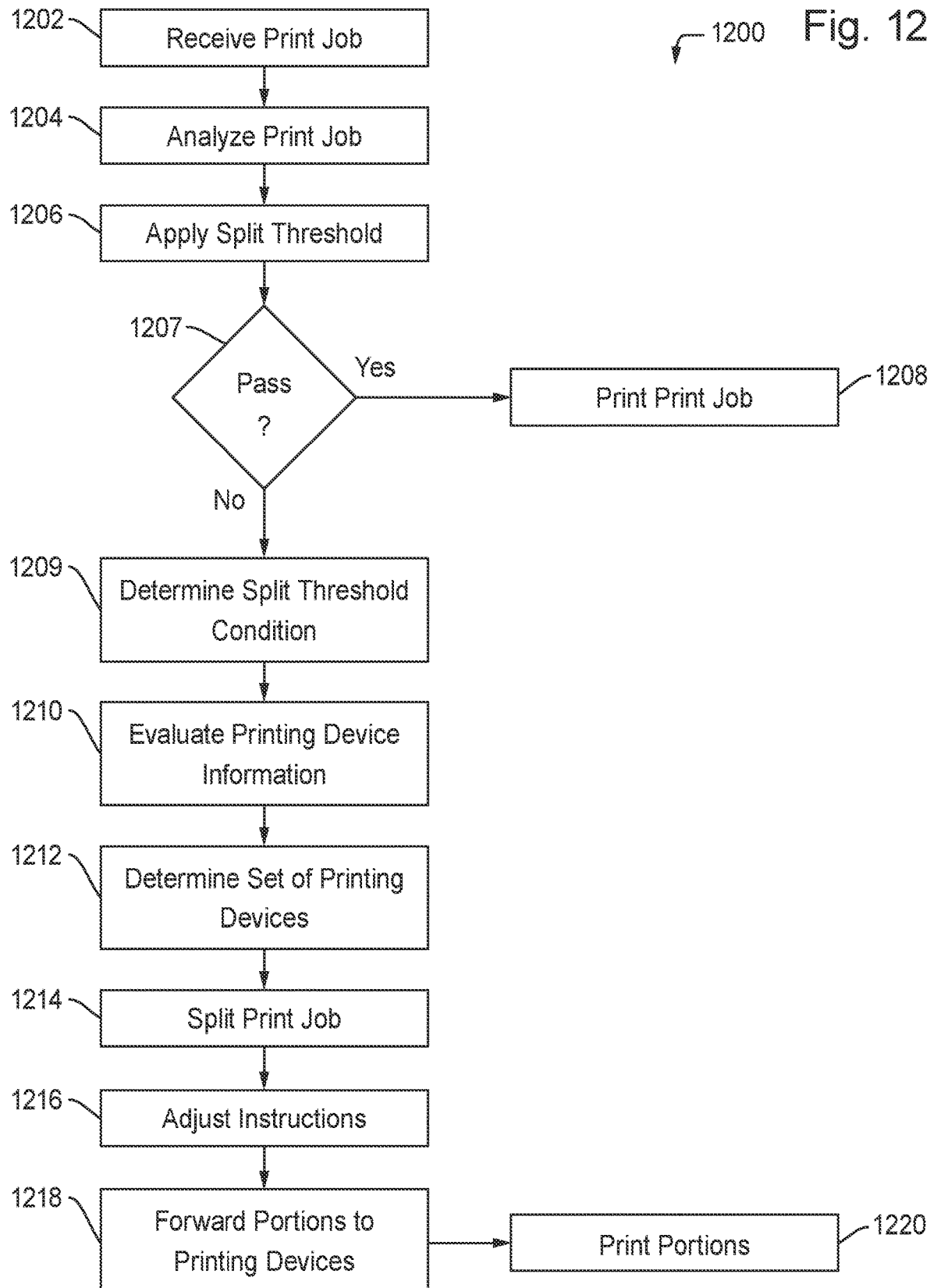

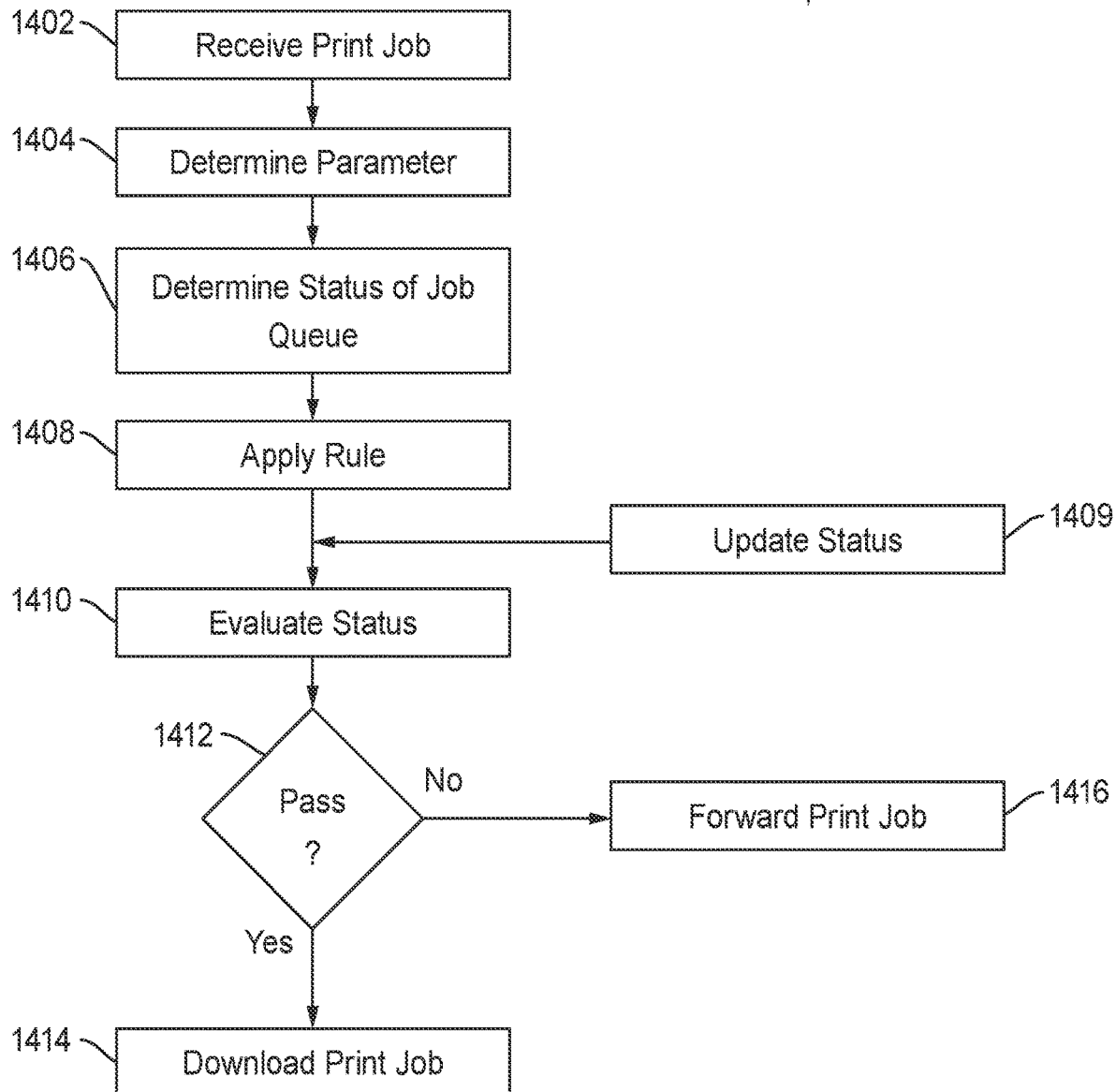

PRINTING SYSTEM FOR PEER-TO-PEER OUTPUT MANAGEMENT

FIELD OF THE INVENTION

The present invention relates to peer-to-peer management of output from color printing operations within a color printing system.

DESCRIPTION OF THE RELATED ART

Output management is a common production print operation that distributes print jobs to different printing devices. It may be used to optimize production printing in print shops with multiple printing devices. Output management functions may be automated. Such functions include load balancing which distributes print jobs based on the workload of the printing devices. Capability matching routes print jobs to the printing device whose capabilities, such as press sheet size, inline finishing, and the like, match job requirements. Failover forwards print jobs from a print job that has a problem that the operator cannot resolve. Splitting divides a print job between multiple printing devices to enable faster job completion. Color splitting divides the print job so that color pages print in a color printing device and monochrome pages print in a monochrome printing device. This function involves changing the print ticket in one of the printing devices so that the output of the other printing device is collated into the print output so the output is the combined job.

These functions are enabled by an output management server. The use of an output management server means that all print jobs are routed through the central server that must have the capacity to process print jobs fast enough to feed all printing devices. For this reason, a practical limit exists as to the number of printing devices that output management systems can concurrently support. Further, output management systems typically are expensive solutions that do not make sense for every print shop or situation.

SUMMARY OF THE INVENTION

A method for managing printing operations is disclosed. The method includes connecting a digital front end (DFE) of a second printing device to a DFE of a first printing device to form a peer-to-peer network. The method also includes exchanging printing device information for the first printing device and the second printing device between the DFE of the first printing device and the DFE of the second printing device. The method also includes detecting a change in the printing device information by the DFE of the first printing device. The method also includes sending an instruction from the DFE of the first printing device to the DFE of the second printing device regarding the change in the printing device information. The method also includes modifying an action within the DFE, of the second printing device in response to the change indicated by the instruction received from the DFE of the first printing device.

A method for managing printing operations is disclosed. The method includes connecting a digital front end (DFE) of a second printing device to a DFE of a first printing device to form a peer-to-peer network. The method also includes exchanging printing device information for the first printing device and the second printing device between the DFE of the first printing device and the DFE of the second printing device. The method also includes detecting a DFE of a third printing device. The method also includes exchanging printing device information for the third printing device and the first printing device between the DFE of the third printing device and the DFE of the first printing device. The method also includes sharing the printing device information for the third printing device with the DFE of the second printing device from the DFE of the first printing device. The method also includes configuring the DFEs of the respective printing devices to share a change in the printing device information for a subject printing device with the remaining printing devices.

A method for managing printing operations is disclosed. The method includes connecting a digital front end (DFE) of a second printing device to a DFE of a first printing device to form a peer-to-peer network. The method also includes exchanging printing device information for the first printing device and the second printing device between the DFE of the first printing device and the DFE of the second printing device. The printing device information includes a job queue status for the respective DFE of the respective printing device. The method also includes receiving a print job at the DFE of the first printing device. The method also includes determining whether a backlog condition exists within a job queue in the DFE for the first printing device. The method also includes, if the backlog condition exists, evaluating the printing device information regarding a job queue for the second printing device. The method also includes forwarding the print job to the DFE for the second printing device based on the job queue for the second printing device.

A method for managing print jobs is disclosed. The method includes connecting a digital front end (DFE) of a second printing device to a DFE of a first printing device to form a peer-to-peer network. The method also includes exchanging printing device information for the first printing device and the second printing device between the DFE of the first printing device and the DFE of the second printing device. The method also includes receiving a print job at the DFE of the first printing device. The method also includes determining a batching criteria for the print job. The method also includes determining whether the batching criteria can be met at the first printing device. The method also includes, if the batching criteria cannot be met, evaluating the printing device information to determine that the second printing device can meet the batching criteria. The method also includes forwarding the print job to the DFE of the second printing device.

A method for managing printing operations is disclosed. The method includes connecting a digital front end (DFE) of a second printing device to a DFE of a first printing device to form a peer-to-peer network. The method also includes exchanging printing device information for the first printing device and the second printing device between the DFE of the first printing device and the DFE of the second printing device. The printing device information includes a capability for the respective printing device. The method also includes receiving a print job at the DFE of the first printing device. The print job includes a requirement. The method also includes determining whether to process the print job at the DFE of the first printing device based on the requirement and the capability of the first printing device. The method also includes determining that the first printing device cannot meet the requirement of the print job based on the capability of the first printing device. The method also includes forwarding the print job to the DFE of the second printing device based on the requirement of the print job and the capability of the second printing device.

A method for managing printing operations is disclosed. The method includes connecting a digital front end (DFE) of a second printing device to a DFE of a first printing device to form a peer-to-peer network. The method also includes exchanging printing device information for the first printing device and the second printing device between the DFE of the first printing device and the DFE of the second printing device. The printing device information includes a printing capability for the respective printing device. The method also includes receiving a print job at the DFE of the first printing device having a requirement. The method also includes determining, at the DFE of the first printing device, whether the first printing device can complete the print job based on the respective printing capability and the requirement of the print job. The method also includes evaluating the printing device information including the printing capability for the second printing device if the DFE of the first printing device determines that it does not provide the printing capability to meet the requirement to complete the print job. The method also includes forwarding the print job to the DFE of the second printing device based on the printing capability for the second printing device.

A method for managing printing operations is disclosed. The method includes connecting a digital front end (DFE) of a second printing device to a DFE of a first printing device to form a peer-to-peer network. The method also includes exchanging printing device information for the first printing device and the second printing device between the DFE of the first printing device and the DFE of the second printing device. The method also includes receiving a print job at the DFE of the first printing device. The method also includes processing the print job at the DFE of the first printing device. The method also includes detecting a problem with printing the print job by the DFE of the first printing device. The method also includes determining that the second printing device can continue the print job based on the printing device information provided by the DFE of the second printing device. The method also includes adjusting a print instruction for the print job at the DFE of the first printing device. The method also includes forwarding the print job to the DFE of the second printing device. The print job is continued at the second printing device according to the print instruction.

A method for managing printing operations is disclosed. The method includes receiving a print job at a digital front end (DFE) for a first printing device. The DFE of the first printing device includes a job queue. The method includes determining a parameter for the print job in view of a status of the job queue. The method includes applying a rule to determine whether to download the print job to the job queue. The rule includes a threshold. The method also includes evaluating the status of the job queue in view of the threshold set forth by the rule. The method also includes downloading the print job to the job queue if the parameter is within the threshold. The method also includes forwarding the print job to a DFE of a second printing device if the status exceeds the threshold.

A method for managing printing operations is disclosed. The method includes connecting a digital front end (DFE) of each of a plurality of printing devices to a DFE of a first printing device to form a peer-to-peer network. The method also includes exchanging printing device information for the first printing device and the plurality of printing devices between the DFE of the first printing device and the DFEs of each of the plurality of printing devices. The printing device information includes a printing capability for the respective printing device. The method also includes receiving a print job at the DFE of the first printing device. The method also includes determining whether a split threshold condition exists within the DFE of the first printing device based on the respective printing capability. The method also includes evaluating the printing device information including the printing capability for the plurality of printing devices if the split threshold condition exists. The method also includes splitting the print job into a portion for each of the plurality of printing devices based on the evaluation. The method also includes forwarding the portion of the print job to the DFEs of each of the plurality of printing devices.

A method for communicating within a printing system is disclosed. The method includes connecting a digital front end (DFE) for a second printing device to a DFE of a first printing device to form a peer-to-peer network. The method also includes exchanging printing device information for the first printing device and the second printing device between the DFE of the first printing device and the DFE of the second printing device. The method also includes adding at least one additional printing device to the peer-to-peer network. The printing device information is shared with a DFE of the at least one additional printing device by the second printing device. The method also includes configuring the peer-to-peer network into a partial mesh network. The second printing device is connected to the at least one additional printing device. The method also includes forwarding an update to the printing device information from the DFE of the first printing device to the DFE of the second printing device. The method also includes forwarding the update from the DFE of the second printing device to the DFE of the at least one additional printing device.

BRIEF DESCRIPTION OF THE DRAWINGS

Various other features and attendant advantages of the present invention will be more fully appreciated when considered in conjunction with the accompanying drawings.

FIG. 1C illustrates a full mesh peer-to-peer network connecting a plurality of printing devices according to the disclosed embodiments.

FIG. 12 illustrates a flowchart for print splitting in a peer-to-peer network according to the disclosed embodiments.

FIG. 14 illustrates a flowchart for applying a rule in managing printing operations according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

Figure 1A:
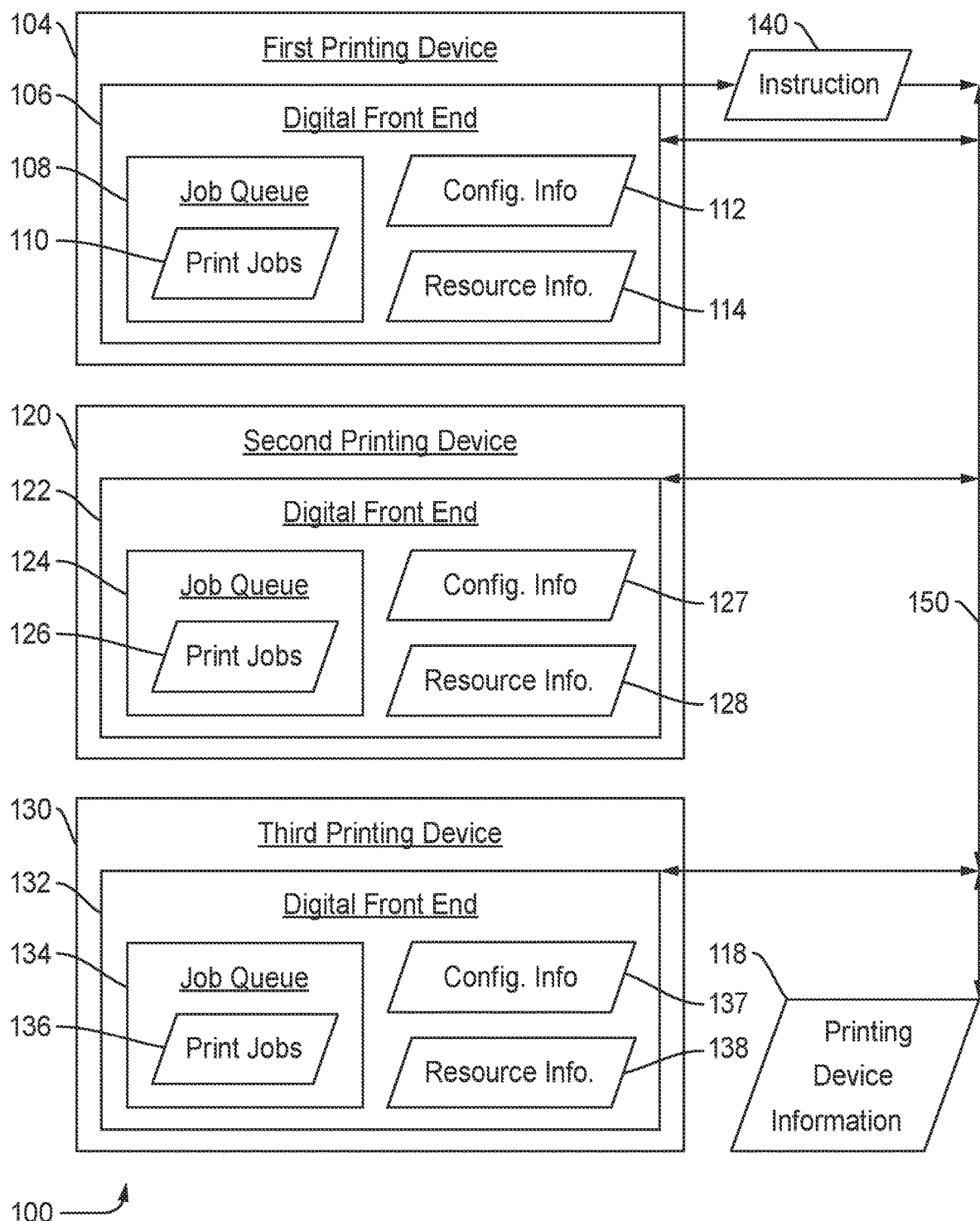
FIG. 1A illustrates a printing system for printing documents in a peer-to-peer network according to the disclosed embodiments.

FIG. 1 depicts a printing system 100 for printing documents using first printing device 104, second printing device 120, and third printing device 130 in a peer-to-peer network according to the disclosed embodiments. Printing system 100 may be located in a print shop or other environment suitable for production printing operations. Printing system 100 includes one or more printing devices 104, 120, and 130 that receive print jobs from one or more client devices.

The disclosed embodiments configure printing system 100 to share information and use that information to enable output management functions without the need for a separate output management server. Although printing system 100 is disclosed in terms of the Exchange Job Messaging Format (XJMF) protocol used in the production print industry, this functionality may be enabled using any protocol that supports print submission, such SMB printing, IPP, LPR, and the like. The functionality also may be enabled via any protocol that provides printing device information, such SNMP, REST API, and the like.

In order to enable load balancing, the printing devices, or the DFEs that control the printing devices, are connected to each other. The DFE allows the user the option to browse for printing devices in system 100 and to establish connections to the printing devices. Once the DFE adds another printing device, it establishes a connection to receive both print job and printing device status from the other DFE. The primary DFE also establishes a connection to send the information to the other printing device. This feature may be enacted via polling. Some embodiments may enable subscriptions so that each printing device automatically sends signals to the other printing device or devices.

Once a connection is established, the printing devices, or the DFEs, may retrieve printing device information. Printing device information may include printing device status, printing device configuration, printing device resource information, such as loaded papers, the number of print jobs at the printing device, print instructions for the print jobs at the printing device, status for the print jobs at the printing device, and the like. In other words, printing device information is exchanged using a peer-to-peer connection between the DFEs of the printing devices.

Once the first connection is established, the operator may connect additional DFEs to either of the DFEs within the peer-to-peer network. When a connection is added, the DFE will share connection information with the other DFE so all DFEs are connected automatically to each other. The operator may keep adding additional printing devices in this manner A printing device connection added to any printing device is shared with all printing devices in the peer-to-peer group. Thus, the disclosed embodiments enable the automated building of a peer-to-peer group of printing devices. System 100 also may use zero-configuration networking to create an automated group of all DFEs in the local subset using some set of one or more rules. This feature would enable the creation of a single group without any configuration from the operator.

The connections are established so that the DFEs can enable peer-to-peer load balancing. There are two possible variations of this load balancing depending on what the protocol supports. In one implementation, the DFE that receives the print job spools the job locally and then automatically forwards it to another printing device. In the preferred embodiments, however, the DFE uses a protocol that allows job submission without sending a job file to the DFE. The DFE may determine whether to produce the print job locally or to forward the print job to another DFE. This feature enables very low overhead output management versus spooling and forwarding. Both implementations enable better management of print job management.

When the DFE receives the print job, it determines how many print jobs are already queued for printing. The disclosed embodiments look at the queues of print jobs and determine whether to look for another printing device to perform printing operations. The determination may be done based on the number of printing jobs in the queue, the total number of impressions, the time required to print the print jobs, and the like, for all of the print jobs in the queue. If the backlog is above a threshold, the disclosed embodiments will evaluate the queue information for the other DFEs in the group. If there is another DFE that could print the print job faster, then the DFE will forward the print job to that DFE. The second DFE will download the job files and process the print job as normal.

In some embodiments, a printing device's status may be used so that printing devices that are offline forward print jobs to other printing devices that are available. The forwarding printing device also may make sure that the receiving printing device is at an acceptable status. The embodiments also may include or exclude specific statuses that may be more transient. For example, an output bin full status may not be used for load balancing. Thus, the disclosed embodiments enable peer-to-peer load balancing.

For capability matching, when the DFE receives the print job, it evaluates the print instructions for the print job. The printing device may determine to forward the print job to another printing device if the receiving printing device cannot process the print job without operator intervention, such as if the required paper is not loaded. In addition, the receiving printing device also may choose to forward the print job to another printing device if the print job requires finishing and the receiving printing device does not have the required finishing inline.

Once the DFE decides to forward the print job, it will retrieve configuration for other printing devices and forward the print job to the other printing device. Alternatively, the receiving printing device may evaluate device capabilities and forward the print job to a printing device having the desired capability. The disclosed embodiments perform these actions on a peer-to-peer basis using the DFEs of the connected printing devices. Further, the DFE may combine capability matching and load balancing to select between multiple printing devices that have the ability to produce the print job without operator intervention. Moreover, the DFE may be configured to enable or disable specific criteria for capability matching.

If the printing device has started to process the print job but detects a problem, then it may determine whether the problem can be resolved by an operator. If not, then the DFE may forward the print job to another printing device. Before forwarding the print job, the DFE will adjust the print instructions so that the last sheet printed successfully is the first sheet processed in the second printing device. This functionality is enabled as peer-to-peer functionality without the need for server intervention. Further, the failover operations may be combined with capability matching and load balancing.

The failover boundary may be determined dynamically based on the print ticketing instructions for the print job. For print jobs that are not finished together, the failover operation will happen at the last good sheet. The first sheet for the print job in the failover printing device will be the last good sheet at the printing device that had a problem. For print jobs that are finished together, the boundary may be at the copy. The print job at the new printing device will start at the first page of the copy that was unfinished. For print jobs that use subset finishing, the boundary may be set at the last good sheet if the sheet is not part of the subset of pages that are finished together or the first page of the currently printing subset portion of the print job. For print jobs that include tab sheets, the printing device that receives the print job may purge tabs until the next tab in the feeder matches the next required tab for the forwarded print job.

If the printing device receives a print job that exceeds the split thresholds, then the disclosed embodiments will split the print job between multiple printing devices. A print job may exceed the split thresholds according to the number of pages, the number of variable data printing (VDP) records, print quantity above a certain threshold, time required to complete the print job, and the like. If the print quantity is too high, then the DFE will forward the print job to a number (N) of DFEs and adjust the quantities so that the total number of copies produced in all printing devices match the originally requested number of copies. If the number of pages or records is too high, then the DFE will forward the entire print job to a number (N) of DFEs and set different ranges of pages/records for each DFE. The disclosed embodiments implement the job splitting functionality in a peer-to-peer manner. The splitting may be adjusted further so that the print job is split into a subset of printing devices based on the workload of the printing devices. The splitting also may be adjusted based on the speed of the printing devices so that all printing devices complete the print job at roughly the same time based on their speeds. This feature also may be combined with capability matching and load balancing.

The disclosed embodiments also may implement color splitting in a peer-to-peer manner. Color splitting is similar to splitting, as disclosed above, except that the job pages are divided so that color pages go to one printing device and monochrome (black and white) pages go to another printing device. The print instructions for one of the printing devices may be adjusted so that the pages from the other printing device are inserted into the first printing device. The color splitting feature also may be combined with capability matching and load balancing.

A peer-to-peer network may be used by system 100 to exchange data between the devices within system 100. The devices are configured to communicate over a physical communications interface or layer such as air interfaces and/or a direct wired connection. Air interfaces may be a given cellular communications protocol (e.g., GSM, CDMA, W-CDMA, EVDO, eHRPD, EDGE, 4G LTE, 5G LTE, 5G NR/New Radio, etc.) and, or a wireless IP protocol (e.g., IEEE 802.11 family) Alternatively, the peer-to-peer network of the printing devices may be a local area network, wide area network, or an ad-hoc network. Printing devices 104, 120, and 130 exchange data using the appropriate protocol.

First printing device 104 is an example printing device and is disclosed in greater detail below. Second printing device 120 and third printing device 130 may include the features disclosed for printing device 104. First printing device 104 includes an embedded digital front end (DFE) 106, or a printing device controller, that is the workflow touchpoint which accepts a print job, or print file, commonly a PDF or PostScript file. DFE 106 converts the file of a received print job into a format that print engine 260, disclosed below, can use to lay down the content of the document corresponding to the print job on a media. DFE 106 may include a raster image processor (RIP) as well as other components. DFE 106 also may schedule when a received print job is processed and other operations related to printing operations. DFE 106 is disclosed in greater detail below.

DFE 106 includes job queue 108. Job queue 108 receives and holds print jobs 110 until they are ready to be printed. For example, job queue 108 may include print job 1, print job 2, print job 3, and print job 4 as print jobs 110. Print jobs 110 may be processed in a certain order, such as when received at printing device 104 or by a ticket order. These features are disclosed in greater detail below.

DFE 106 may store certain information about printing device 104. Configuration information 112 may include device information about printing device 104, such as one or more trays 230 and one or more output bins 227, disclosed in FIG. 2 below. Configuration information 112 also may include capabilities of printing device 104, such as stapling, punching, printing on both sides, and the like. DFE 106 also may store resource information 114, which includes the loaded papers, ink and toner information, available disk or memory space, the paper catalog, and the like.

Printing devices 120 and 130 include similar features. Printing device 120 includes DFE 122, which includes job queue 124 having print jobs 126 and stores configuration information 127 as well as resource information 128. As can be appreciated, configuration information 127 and resource information 128 stored by DFE 122 of printing device 120 most likely differs from the configuration and resource information of printing device 104. Each printing device includes its own specific information about its configuration, resources, and capabilities.

Printing device 130 includes DFE 132, which includes job queue 134 having print jobs 136 and stores configuration information 137 and resource information 138. Configuration information 137 and resource information 138 also most likely differ from the configuration and resource information for printing device 104 and 120. The disclosed embodiments collect this information and make the information available to all printing devices connected together.

Printing device 104, 120, and 130 are connected in a peer-to-peer network that enables them to share information and use that information to manage output functions without the need of a separate output management server. In order to enable output management, DFEs 106, 122, and 132 are connected to each other. The DFEs allow the operator the ability to browse for printing devices in system 100 and to establish connections to them.

For example, DFE 106 may be used to browse for printing devices 120 and 130. Printing device 120 may be added to the peer-to-peer network with printing device 104. DFE 106 may establish a connection 150 to send information to printing device 120 to receive both job and printing device status from DFE 122. DFE 106 also may use connection 150 to send the same information about printing device 104 to DFE 122. Preferably, this feature is enabled using subscriptions so that each printing device, or DFE automatically sends signals to the other printing device. When a change occurs to any of the status or information, such as at printing device 104, DFE 106 sends an instruction, or signal, 140 to DFE 122 as it subscribes to it in the peer-to-peer network. Alternatively, system 100 may enable polling to send instruction 140 between the DFEs.

After the connection between printing devices 104 and 120 is established, printing device 130 may be added to the peer-to-peer network using connection 150. Again, the information is exchanged and subscriptions enabled to allow the printing devices to exchange information. Using subscriptions between the printing devices in the peer-to-peer network, a persistent connection does not need to be kept running. The DFEs can communicate with each other directly.

The information provided by the printing devices within the peer-to-peer network may be merged into printing device information 118. Printing device information 118 may be a data file shared between the DFEs for printing devices 104, 120, and 130. Thus, every printing device stores the pertinent information for the other printing devices. Printing device information 118 also is synchronized with the job queue status and information, configuration information, resource information, capabilities, and the like. Thus, printing device information 118, for example, includes status and information for job queues 108, 124, and 134, configuration information 112, 127, and 137, and resource information 114, 128, and 138.

After the peer-to-peer network is created, additional printing devices may be added. For example, if the peer-to-peer network includes first printing device 104 and second printing device 120, then third printing device 130 may be selected for addition to the network. As disclosed above, an operator may browse available printing devices within system 100 for selection. DFE 106 of first printing device 104 may establish connection 150 between DFE 132 of third printing device 130. DFE 106 may receive print job and printing device status for job queue 134, configuration information 137, and resource information 138 from DFE 132. DFE 106 also establishes connection 150 to send this information to DFE 122 of second printing device 120.

Once connection 150 is established, both printing devices can retrieve the following information from each other, shown as printing device information 118. Printing device information 118 may include the following information for third printing device 130: printing device status, printing device configuration, printing device resource information, such as loaded papers, input trays, output trays, toner and ink levels, available disk space, and the like. The information also may include the number of print jobs in the printing device, such as three (3) print jobs for job queue 134. The information also may include print instructions for the print jobs at the printing device as well as the status for the print jobs.

The same information for printing devices 104 and 120 is shared with third printing device 130. All three printing devices are automatically connected to each other in the peer-to-peer network. The operator may keep adding additional printing devices in the same manner A connection to an added printing device is shared with all the printing devices in the peer-to-peer network. The building of the peer-to-peer network is automatic in that the printing device information is collected and distributed without the need for a central server or operator intervention. Further, once the connections are established, DFEs 106, 122, and 132 can enable peer-to-peer load balancing, capability matching, failover operations, and print splitting between the printing devices in an automatic manner.

The disclosed embodiments also may use zero-configuration networking to create the automated group of all DFEs in a local subset. This feature enables the creation of a single group without any configuration from the operator. A printing device is added according to the same set of rules or functions as disclosed above. If the printing device is outside the subset, then the operator may need to add to the peer-to-peer network manually.

Figure 1B:
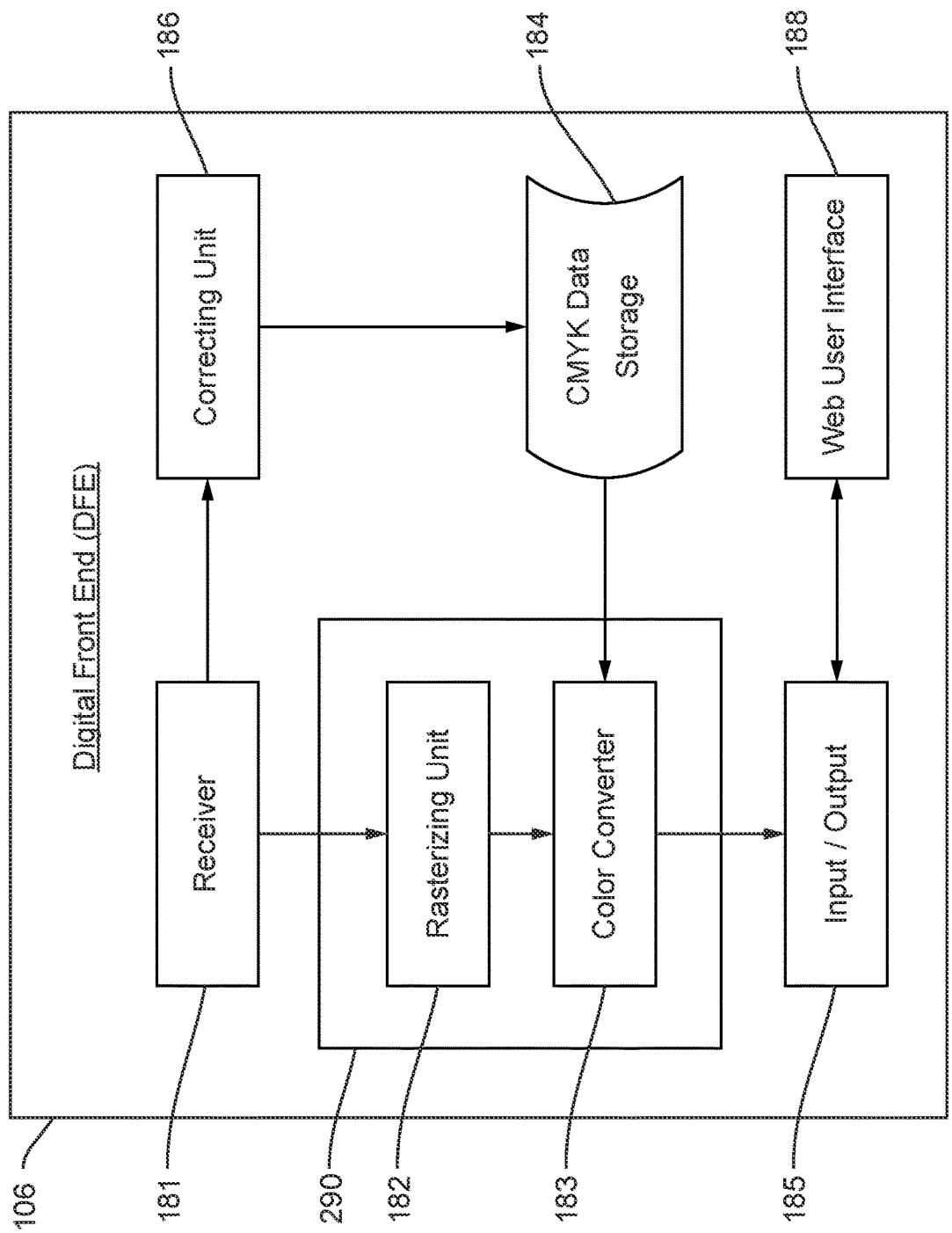
FIG. 1B illustrates a digital front end (DFE) for a printing device according to the disclosed embodiments.

FIG. 1B depicts a block diagram of DFE 106 according to the disclosed embodiments. The features disclosed by FIG. 1B also may apply to DFEs 122 and 132. DFE 106 includes a receiver 181, an RIP firmware 290 including rasterizing unit 182 and a color converter 183, an CMYK data storage 184, an input/output connector 185, and a correcting unit 186. RIP firmware 290 also is disclosed in FIG. 2. Additional components within DFE 106 may be implemented, including those disclosed in FIG. 1A. DFE 106, therefore, also stores configuration information 112 and resource information 114, and includes job queue 108, even though these are not shown in FIG. 1B.

Receiver 181 receives a print job received within system 100 and outputs the print job to rasterizing unit 182 of RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

Rasterizing unit 182 converts image data associated with the print job into raster data to thereby generate rendering data, and outputs the generated rendering data to color converter 183. Color converter 183 converts the rendering data from rasterizing unit 182 into rendering data in a CMYK format. When the rendering data is originally in the CMYK format, or CMYK rendering data, the conversion may not be performed. Color converter 183 performs gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

RIP firmware 290 includes rasterizing unit 182 and color converter 183. The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with printing devices 120 and 130 using, for example, input/output connector 185. Web user interface 188, or web application, allows a user of the DFEs of other printing devices to interact with content or software running on DFE 106.

In some embodiments, the connections between the printing devices in the peer-to-peer network may be configured in a full mesh network. Alternatively, the printing devices in the peer-to-peer network may be configured in a partial mesh network. The different configurations may impact how the printing devices communicate to each other for updates, queries, sharing of printing device information 118, and the like.

FIG. 1C depicts a full mesh peer-to-peer network 160 connecting a plurality of printing devices according to the disclosed embodiments. Network 160 includes printing devices 104, 120, and 130, as disclosed above. It also includes printing device 162. Printing device 162 may be added to network 160 as disclosed above and below with regards to FIGS. 4 and 5. The printing device information for printing device 162 is included in printing device information 118 available to network 160.

Connections 150 provide the links to allow each printing device within network 160 to communicate with all of the other printing devices. Each printing device sets up its own subscription to the other printing devices. For example, printing device 104 sets up its own subscriptions to printing devices 120, 130, and 162. It receives signals directly from a connected printing device whenever any relevant information changes at that printing device. For example, printing device 130 establishes subscriptions to printing devices 104, 120, and 162. Any change in relevant printing device information within any of those printing devices will be result in a signal to printing device 130. In other words, network 160 provides direct connections 150 between all of the printing devices within network 160.

The full mesh configuration of network 160 may be applicable for production printing environments with a limited number of printing devices. Further, the need for quick distribution of printing device information 118 may be important to meet the demands of large print jobs. For capability matching, printing device 104, for example, may need information expeditiously in order to process and complete a large print job needing the capabilities of printing devices 120, 130, and 162.

Figure 1D:
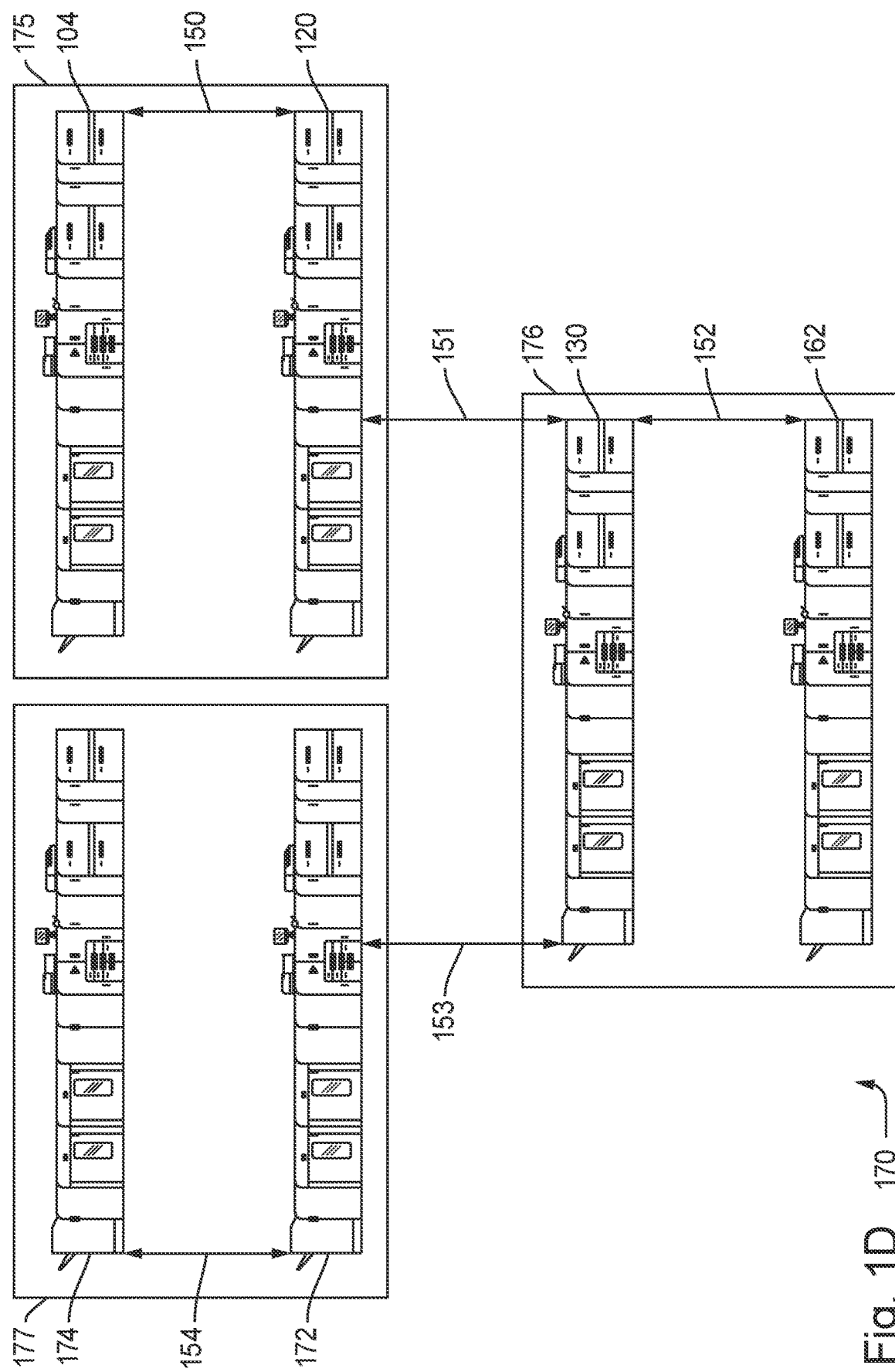
FIG. 1D illustrates a partial mesh peer-to-peer network connecting a plurality of printing devices according to the disclosed embodiments.

FIG. 1D depicts a partial mesh peer-to-peer network 170 connecting a plurality of printing devices according to the disclosed embodiments. In some embodiments, direction connections between a peer-to-peer network may not be feasible due to the large number of printing devices, such as an office environment. Further, complete connections between every printing device may not be feasible.

Thus, network 170 discloses a partial mesh peer-to-peer network between the DFEs of the printing devices. Network 170 may be established instead of implementing an output management server within printing system 100. Network 170 includes printing devices 104, 120, and 130 plus printing devices 172 and 174. Printing devices 172 and 174 may be added to network 170 as disclosed above. When added, network 170 may determine that printing devices 162 and 172 are connected to printing device 130 but not to printing devices 120 and 104. Printing device 174 is connected to printing device 172.

Printing device 104 connects to printing device 120 using connection 150. Printing device 130 is added to network 170 but does not access connection 150. Instead, connection 150 is established between printing devices 120 and 130. Information is still shared with printing device 104 from printing device 130 but it goes through printing device 120. This feature also is implemented between printing device 130 and the newly added printing devices. Network 170 adds printing device 162, which exchanges printing device information with printing device 130 using connection 152. A change in printing device 104, therefore, will be provided to printing device 120 over connection 150 then to printing device 130 from printing device 120 over connection 151. Finally, the change in printing device information for printing device 104 will be provided to printing device 162 from printing device 130 over connection 152.

Network 170 then may add printing devices 172 and 174. A rule may be implemented in network 170 that a printing device may only have three direct connections with other printing devices. Thus, printing device 130 may not be directly connected to printing device 174. Network 170 configures printing device 174 to exchange printing device information with printing device 172 over connection 154, which then provides the information to printing device 130 over connection 153 and so on. The printing device information is updated accordingly using the connections as configured within network and not directly as disclosed in FIG. 1C.

The partial mesh configuration of network 170 reduces stress by not establishing direct connections between every printing device. Further, network 170 may implement rules used in performing load balancing and capability matching. For example, printing device 104 may need to refer a print job to another printing device and uses its connection to printing device 120 to send a signal requesting statuses from the other printing devices. Printing device 130 may obtain the information for printing devices 162, 172, and 174. It then may apply any rules, as disclosed below, to filter out those printing devices not capable of taking the print job.

In other embodiments, network 170 may include printing devices in different physical locations. Direct connections may not be possible or unwieldy to implement. For example, printing devices 104 and 120 are in a first location, or location 175, printing devices 130 and 162 are in a second location, or location 176, and printing device 172 and 174 are in a third location, or location 177. Connection 151 allows location 175 to communicate with location 176 while connection 153 allows location 176 to communicate with location 177. The connections within each location may establish a subnet at that location.

Printing device 120 may communicate with printing devices outside location 175 within network 170. Printing device 130 may do the same for location 176 and printing device 172 for location 177. Within network 170, location 177 may not be connected to location 175. Using the partial mesh configuration, network 170 exchanges printing device information between the locations without the need for an output management server.

In some embodiments, communication within network 160 may be done using a broadcast protocol. In other embodiments, a multicast protocol may be implemented within network 160 or network 170 to manage the delivery of the subscription signals within the network. For a broadcast configuration, the subscription signals go to all the connected printing devices within the network, such as shown in network 160. For a multicast configuration, the subscription signals go to a required set of devices within the network, such as shown in network 170. It should be noted that a multicast protocol also may be implemented in network 160.

Multicasting may be more efficient than broadcasting as it takes up less resources. For example, a network using multicasting may require less bandwidth when compared to broadcasting as not as much of it is needed for constant communication. Referring to network 170, printing device 104 only needs to exchange printing device information with printing device 120 over connection 150 and not with printing device 130, 162, 172, or 174.

For example, a broadcast protocol may transmit the subscription signal to multiple devices at the same time within the peer-to-peer network. Printing device 104 sends signals to printing devices 120, 130, and 162 of network 160 due the subscriptions over connections 150. Although convenient, the broadcast protocol may cause security issues and generate data loss.

A multicast protocol may transmit the subscription signals to a group of printing devices in a network simultaneously. It may be more secure in that only some users receive the signals. It also divides a single transmission between printing devices to minimize bandwidth. User Datagram Protocol (UDP), for example, may be used. Using the example above, printing device 104 may only send signals to printing device 120 and 130 in network 160 and only to printing device 120 in network 170. The multicast protocol may be defined within the network to manage the subscriptions.

In other embodiments, referring to FIG. 1D, locations 175 and 176 may be in the same location and within the same subnet. Location 177 is in a different location. Communication occurs between the two locations via connection 153 between printing device 130 and printing device 172. Within network 170, a multicast protocol may be established between the printing devices at locations 175 and 176 and another multicast protocol between the printing devices at location 177. Using this example, a change to printing device information in printing device 162 may be sent to printing devices 104, 120, and 130 using the subnet multicast protocol. Printing device 130 then may send a signal to printing device 172.

Figure 2:
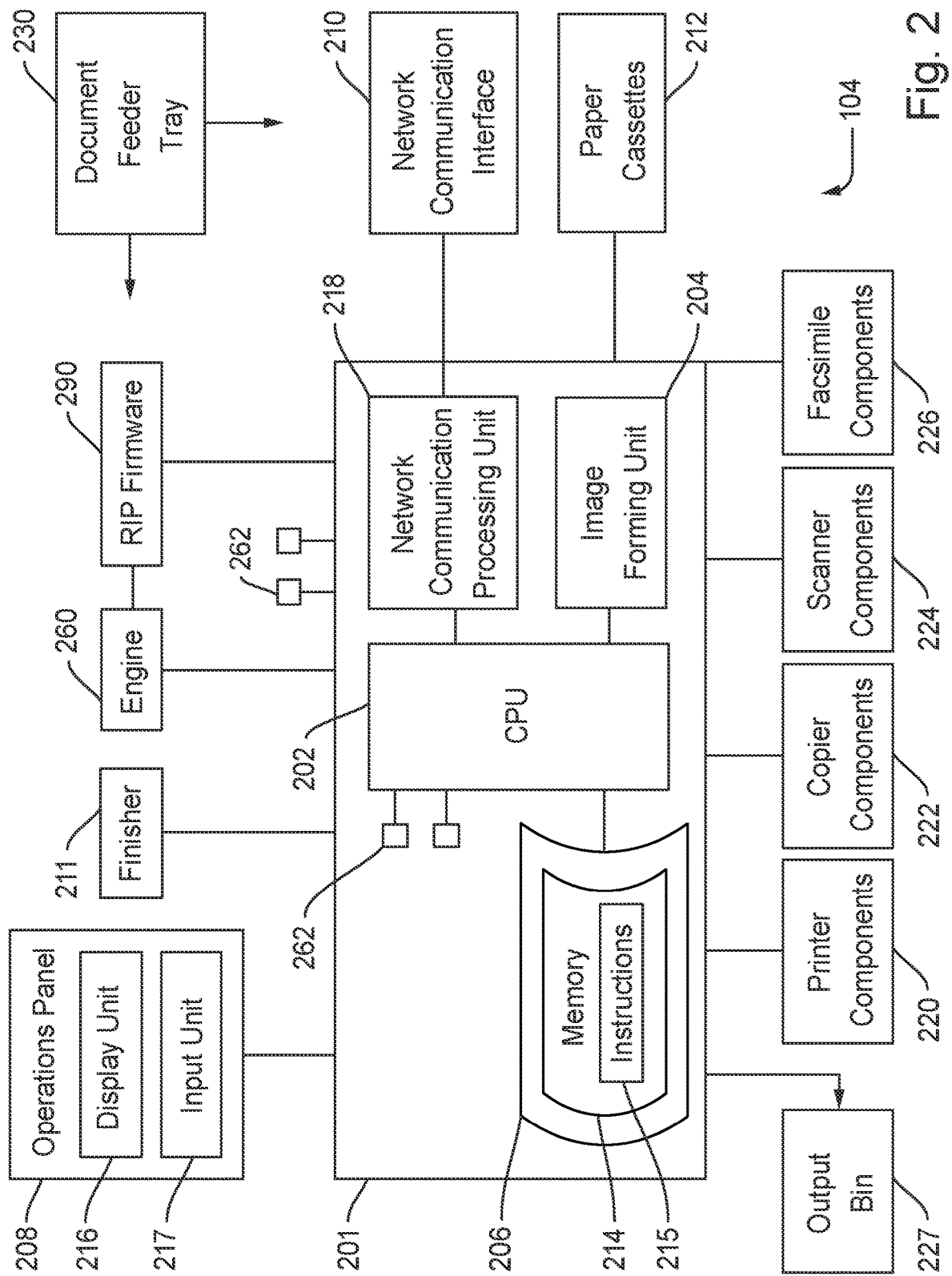
FIG. 2 illustrates a block diagram of components of the printing device for use within the printing system according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100, such as printing devices 120 and 130. As disclosed above, printing device 104 may send and receive data from DFE 122 of printing device 120 and DFE 132 of printing device 130, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from printing device 120 and 130 as well as other printing devices establishing a connection 150 to establish the peer-to-peer network.

Figure 3:
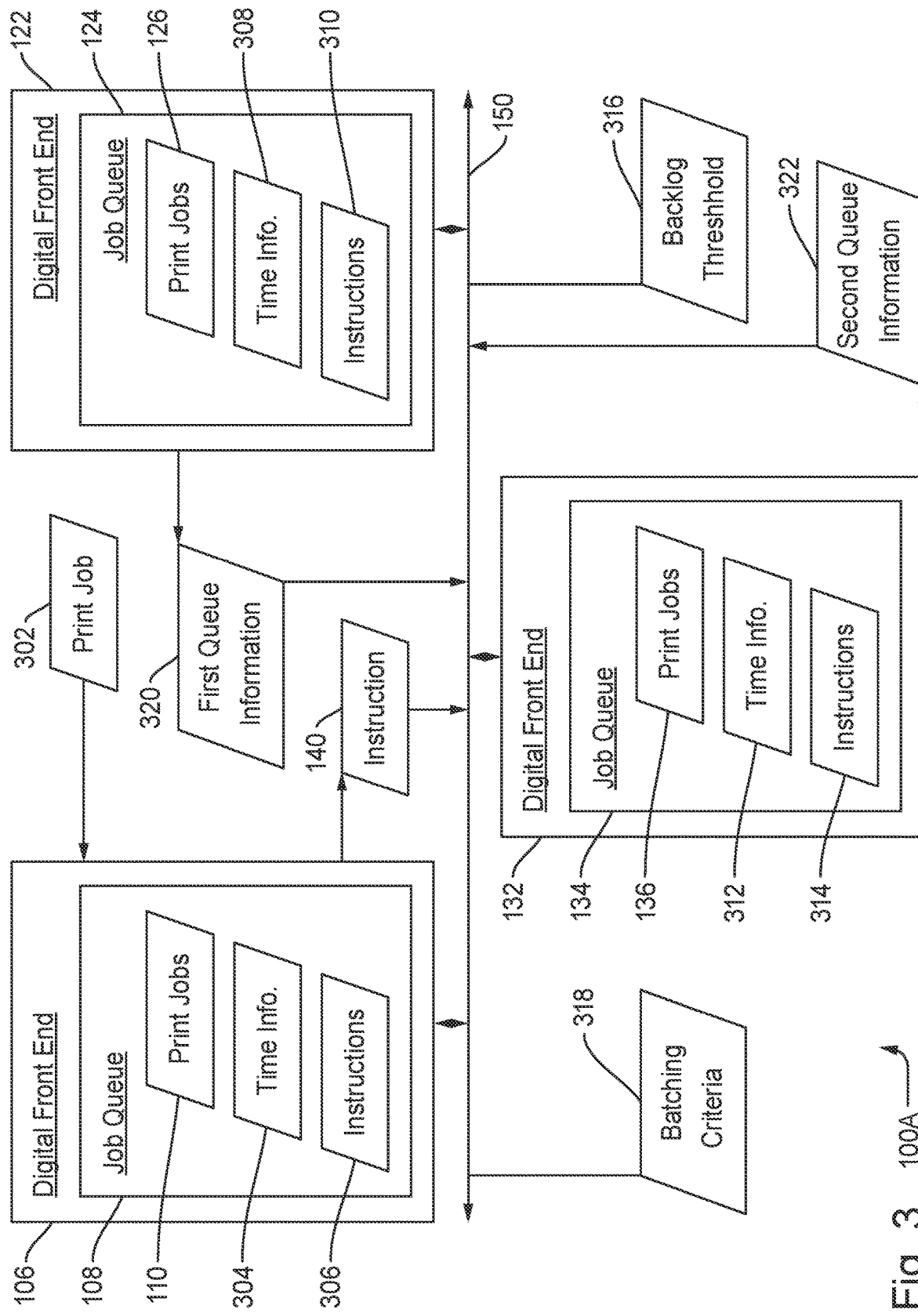
FIG. 3 illustrates a block diagram of load balancing operations in a peer-to-peer network of the printing devices according to the disclosed embodiments.

FIG. 3 depicts a block diagram of load balancing operations in a peer-to-peer network of printing system 100A of the DFEs for printing devices 104, 120, and 130 according to the disclosed embodiments. As disclosed above, the DFEs of the connected printing devices may exchange information in order to manage printing operations automatically. In other words, the DFEs can manage printing operations to increase efficiency and responsiveness in a peer-to-peer manner. These features include load balancing so that print jobs are treated in a timely and efficient manner. In short, if a receiving printing device has a backlog of print jobs to process, then it may evaluate queue information in the other DFEs to determine whether to send the print job to another printing device.

There may be two possible variations of the load balancing depending on what the protocol for the peer-to-peer network supports. For example, print job 302 is received at DFE 106 of first printing device 104. DFE 106 may spool, or process, print job 302 locally and then automatically forward it to another printing device. Alternatively, DFE 106 uses a protocol that allows job submission without sending the job file to the DFE. DFE 106 then may determine whether to produce the job locally or to forward print job 302 to another DFE. A benefit of this function is that it enables low overhead output management versus spooling then forwarding. The other components of DFE 106, such as RIP firmware 290, do not need to be involved.

With regard to load balancing, the disclosed embodiments rely on the status and information provided by the DFEs in printing device information 118 for the job queues and pending print jobs. When print job 302 is received at DFE 106, the DFE determines how many print jobs 110 are pending in job queue 108. In this instance, job queue 110 includes print job 1, print job 2, print job 3, and print job 4. Further, print jobs 110 include associated information that impact processing and finishing the print jobs including time information 304 to finish each print job, or the total number of print jobs. Other associated information includes instructions 306 which may relate to special processing instructions for printing and finishing the jobs, such as stapling, printing on both sides, and the like that also impact the time to finish the job. Instructions 306 also may include ticketing information for print jobs 110.

The other DFEs connected to DFE 106 also include these features. Thus, DFE 122 includes job queue 124 with print job 1 and print job 2 of print jobs 126 along with time information 308 and instructions 310. DFE 132 includes job queue 134 with print job 1, print job 2, and print job 3 of print jobs 136 along with time information 312 and instructions 314. The DFEs may exchange this information when requested through the subscriptions or through polling at specified times.

After receiving print job 302, DFE 106 looks at job queue 108 and print jobs 110 to determine whether the number of print jobs or time information 304 associated with completing the print jobs exceeds backlog threshold 316. Backlog threshold 316 may be a value set to trigger load balancing by a receiving printing device. For example, backlog threshold 316 may be four print jobs in a job queue. Backlog threshold 316 also may relate to the number of impressions for the print jobs in the job queue. There may be a few print jobs but these print jobs require a large number of impressions to complete. An impression may relate to a single printed image from a printing surface, such as each page. Backlog threshold 316 also may be related to the size of the print jobs. Alternatively, it may be 15 minutes to complete all the pending print jobs in a job queue. In any event, backlog threshold 316 relates to a threshold that indicates that print job 302 can be processed more timely at another printing device.

Backlog threshold 316 may be set by an operator and applied to all the printing devices within the peer-to-peer network. Alternatively, each printing device and respective DFE may have its own backlog threshold 316 as different printing devices have varying capacities to process print jobs. For example, backlog threshold 316 for DFE 106 may be four print jobs while the backlog threshold for printing device 130 may be seven print jobs as it includes components to print faster, such as additional output trays.

In the present instance, print job 302 is received at DFE 106. Backlog threshold 316 for DFE 106 is four print jobs. Print jobs 110 of job queue 108, therefore, includes print jobs 1-4. Thus, DFE 106 determines that backlog threshold 316 is exceeded and a backlog condition exists for first printing device 104. DFE 106 sends instruction 140 as a signal to second printing device 120 and third printing device 130 of the peer-to-peer network. Instruction 140 is sent to DFE 122 and DFE 132 from DFE 106 automatically upon detection of the backlog condition.

Alternatively, the disclosed embodiments may rely upon the total number of impressions needed to complete print jobs 110. For example, print job 1 may only require three (3) impressions to complete as compared to another print job having 100s of impressions. Thus, backlog threshold 316 may be based upon time to complete the pending print jobs as opposed to the number of print jobs.

DFEs 122 and 132 return first queue information 320 and second queue information 322, respectively. Queue information includes a status of the respective job queue, the number of pending print jobs, time to complete the print jobs, and the like. Queue information 320 from DFE 122 includes a status for job queue 124. A status may relate to whether a backlog condition exists at job queue 124. DFE 122 may determine whether the backlog condition exists based on backlog threshold 316. Alternatively, DFE 106 may make this determination upon receiving queue information 320. Queue information 320 also may include the number of print jobs 126 and time information 308 needed to complete the print jobs.

Queue information 322 from DFE 132 includes a status for job queue 134. A status may relate to whether a backlog condition exists at job queue 134. DFE 132 may determine whether the backlog condition exists based on backlog threshold 316. Alternatively, DFE 106 may make this determination upon receiving queue information 322. Queue information 322 also may include the number of print jobs 136 and time information 312 needed to complete the print jobs.

DFE 106 receives queue information 320 and 322. DFE 106 evaluates the queue information to determine if another DFE can process print job 302 faster than the receiving DFE. If so, then DFE 106 will forward print job 302 to that DFE. For example, DFE 106 may use queue information 320 to determine that job queue 124 only includes two print jobs 126. Time information 308 for completing these print jobs indicates that it will be faster than completing the print jobs in job queue 108 of DFE 106. With regards to DFE 132, queue information 322 indicates that job queue 134 includes three print jobs 136 having time information 312 to complete these print jobs longer than time information 308. Further, DFE 106 may be informed that a backlog condition exists based on backlog threshold 316 for DFE 132. Thus, DFE 106 automatically forwards print job 302 to DFE 122 based on the load balancing criteria of the peer-to-peer network.

The disclosed embodiments also may consider batching criteria 318 in making determinations whether to send print job 302 from the receiving DFE to another DFE in the peer-to-peer network. Batching criteria 318 may relate to instructions for one or more print jobs that instruct certain print jobs be done on the same printing device. For example, batching criteria 318 may instruct the peer-to-peer network to process print jobs having punching instructions on the same device they are done together. Batching criteria 318 also may relate to different media used in system 100. For example, print jobs using transparencies or heavyweight paper may be batched together at a printing device using the media needed to complete the jobs.

DFE 106 may evaluate print job 302 in view of batching criteria 318 to determine whether it should be forwarded to another printing device handling similar print jobs as defined by the criteria. For example, print job 302 may require punching, which is currently being performed for print jobs at printing device 130. Thus, DFE 132 sends instructions 314 in response to instruction 140 received from DFE 106. DFE 106 reviews the received information and determines that it would be best to forward print job 302 to printing device 130. These functions are executed automatically in a peer-to-peer manner so that operator intervention or a management server is not needed. DFE 106 can handle the management and load balancing of received print jobs.

Figure 4:
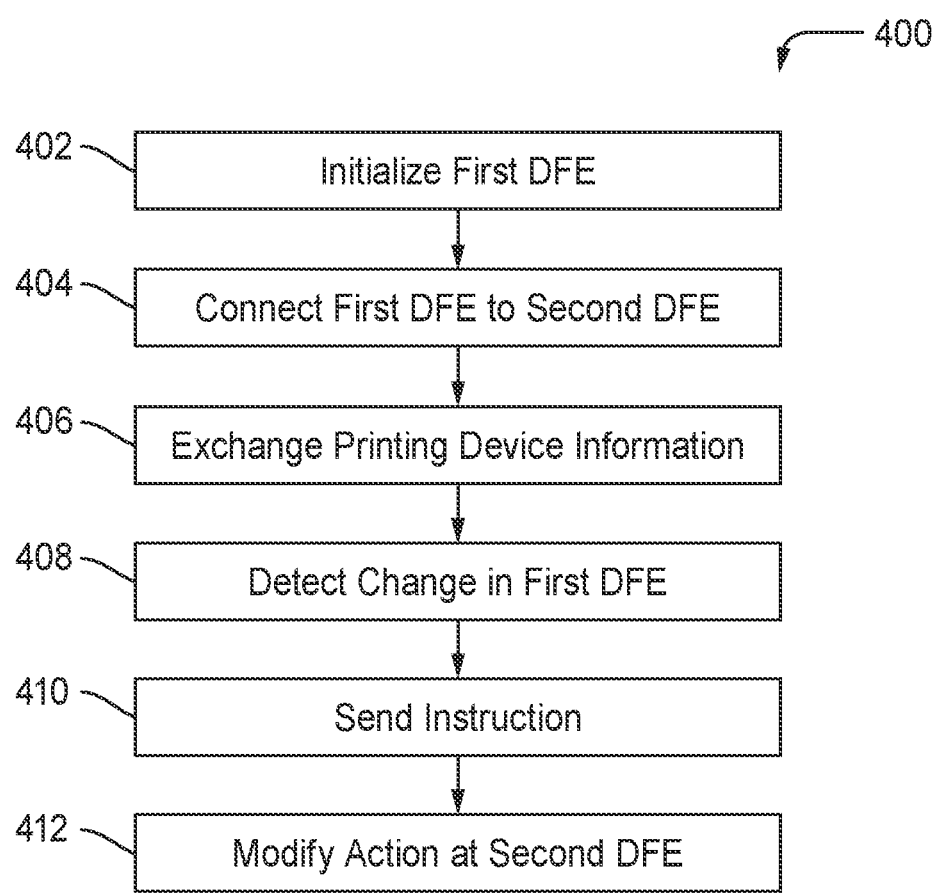
FIG. 4 illustrates a flowchart for establishing a peer-to-peer network between a first DFE and a second DFE according to the disclosed embodiments.

FIG. 4 depicts a flowchart 400 for establishing a peer-to-peer network between a first DFE and a second DFE according to the disclosed embodiments. Flowchart 400 may refer to FIGS. 1A-3 for illustrative purposes. Flowchart 400, however, is not limited by the embodiments disclosed by FIGS. 1A-3. In the disclosure of FIG. 4, the first DFE may refer to DFE 106 of first printing device 104 and the second DFE may refer to DFE 122 of second printing device 120.

Step 402 executes by initializing DFE 106, or the first DFE for the peer-to-peer network. This step may include setting up DFE 106 to support the first few actions to establish the peer-to-peer network, such as the protocol to use in network communication, values for backlog threshold 316 and defining batching criteria 318. DFE 106 also may configured to allow the operator to search printing system 100 for additional printing devices to add to the peer-to-peer network. Thus, step 402 also includes searching for printing devices to connect to DFE 106.

Step 404 executes by connecting DFE 106, or the first DFE, to DFE 122, or the second DFE of second printing device 120. As disclosed above, DFE 106 establishes connection 150 with DFE 122. Step 406 executes by exchanging printing device information 118 for first printing device 104 and second printing device 120 between DFEs 106 and 122. As disclosed above, this information may include job queue status, printing device status, printing device configuration information, resource information, print instructions, the number of print jobs, and the like. This initial sharing of printing device information provides a baseline for each printing device to form the peer-to-peer network. For example, DFE 106 can reference information for job queue 124 of DFE 122 to know whether the number of print jobs 126 currently being handled is in a backlog condition. It also knows that printing device 120 can print stapled copies from configuration information 127 and what papers are loaded onto printing device 120.

Step 408 executes by detecting a change in printing device information 118 by DFE 106 of first printing device 104. This change may involve job queue 108, configuration information 112, or resource information 114. For example, the ink levels for first printing device 104 may have changed. Maybe the ink levels have been increased due to maintenance on first printing device 104. In another example, the paper catalog for the printing device is changed as a paper or media is added or removed. Thus, resource information 114 for DFE 106 is changed. DFE 106 automatically determines to update the other printing devices within the peer-to-peer network.

Step 410 executes by sending instruction 140 to DFE 122 of second printing device 120. Instruction 140 may be a signal sent over connection 150. Preferably, connection 150 allows a subscription function between the DFEs so that instruction 140 is sent whenever a change or other action occurs at a DFE within the peer-to-peer network. Alternatively, a polling function may be defined so that the DFEs poll each other for any change in information.

Step 412 executes by DFE 122 receiving instruction 140 and to exchange printing device information 118 with DFE 106. Alternatively, instruction 140 may indicate the change at DFE 106. Step 412 also executes by modifying an action within DFE 122 in response to the change indicated by instruction 140 received from DFE 106. The modification also may occur after the exchanging of printing device information 118 as prompted by instruction 140. The action may involve how DFE 122 will manage printing operations at itself and in relation with DFE 106. Using the above example, DFE 122 may forward print jobs to DFE 106 during a backlog condition as the ink levels have increased. Resource information 114 for DFE 106 may have indicated that ink level for a primary color were low so that color printing could not be done at first printing device 104. Resource information 114 is changed to indicate that the ink level for the primary color is normal and that color printing may resume. Thus, the action is allowing print jobs to be sent to DFE 106 from DFE 122.

Figure 5:
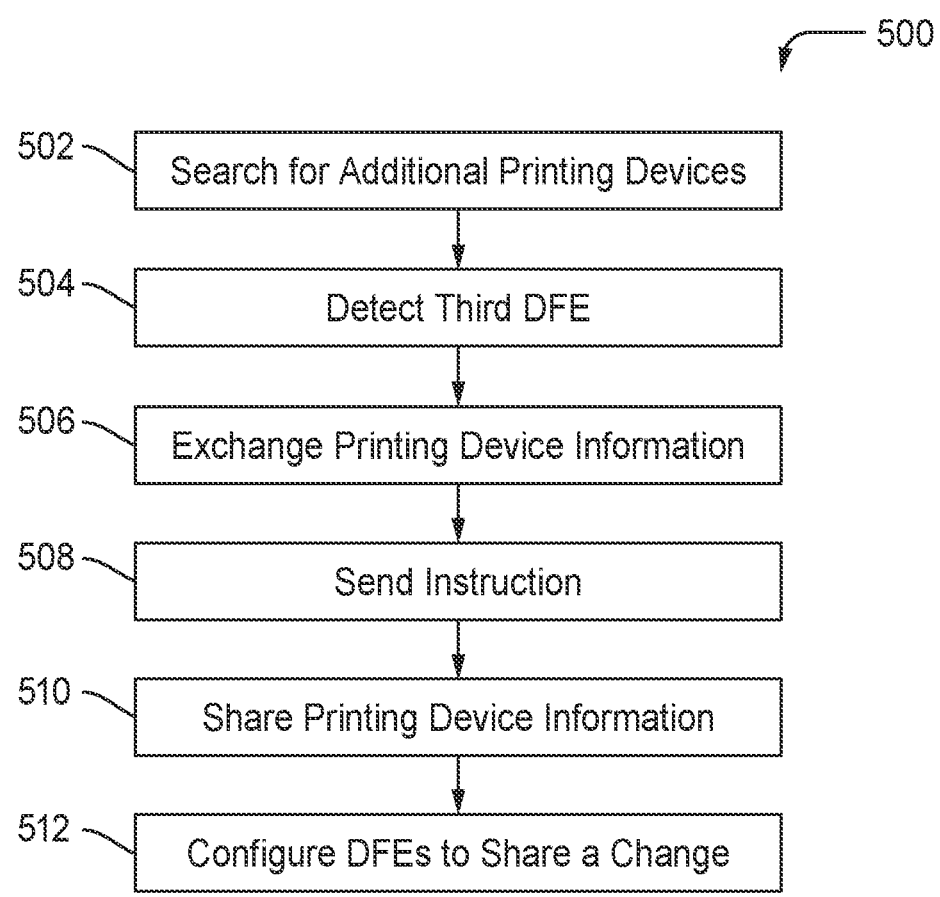
FIG. 5 illustrates a flowchart for adding a printing device to a peer-to-peer network according to the disclosed embodiments.

FIG. 5 depicts a flowchart 500 for adding a printing device to a peer-to-peer network according to the disclosed embodiments. Flowchart 500 may refer to FIGS. 1A-4 for illustrative purposes. Flowchart 500, however, is not limited by the embodiments disclosed by FIGS. 1A-4. The third DFE disclosed below may refer to DFE 132 of third printing device 130.

Step 502 executes by searching for additional printing devices within system 100 from DFE 106, or the first DFE. The peer-to-peer network is already established as disclosed by flowchart 400. First printing device 106 and second printing device 120 have shared printing device information 118 as part of configuring the peer-to-peer network. Step 504 executes by detecting DFE 132, or the third DFE of third printing device 130 as a candidate to join the peer-to-peer network. DFE 132 may indicate that third printing device 130 includes a capability not currently available on first printing device 106 or second printing device 120.

Step 506 executes by exchanging printing device information 118 between DFE 132 of third printing device 130 and DFE 106 of printing device 104. DFE 106 may send a request or instruction 140 to DFE 132 that it would like to form a connection 150 in order to join the peer-to-peer network. DFE 132 then indicates to DFE 106 that it accepts connection 150 and to exchange the printing device information, much like DFE 106 did with DFE 122 disclosed above. Step 508 executes by sending instruction 140 to the remaining printing devices in the peer-to-peer network that third printing device 130 is added. Instruction 140 may be sent over connection 150 between DFE 106 and DFE 122.

Step 510 executes by sharing printing device information 118 for DFE 132 with DFE 122. DFE 106 may share the printing device information 118 that it received during the exchange disclosed above. Alternatively, DFE 122 may request to exchange information with DFE 132 over connection 150 as well. Now, all the printing devices within the peer-to-peer network have access to the printing device information for each other.

Step 512 by configuring the DFEs in the peer-to-peer network to share a change in the printing device information for a subject printing device with the remaining printing devices. In other words, the disclosed embodiments configure DFEs 106, 122, and 132 to send instructions 140 when a change occurs to its information shared with the other devices. This process is disclosed above by flowchart 400. Subscriptions are enabled between the DFEs so that each printing device automatically sends instructions 140, or signals, to the other printing devices. Thus, updates are handled automatically within the peer-to-peer network.

Figure 6:
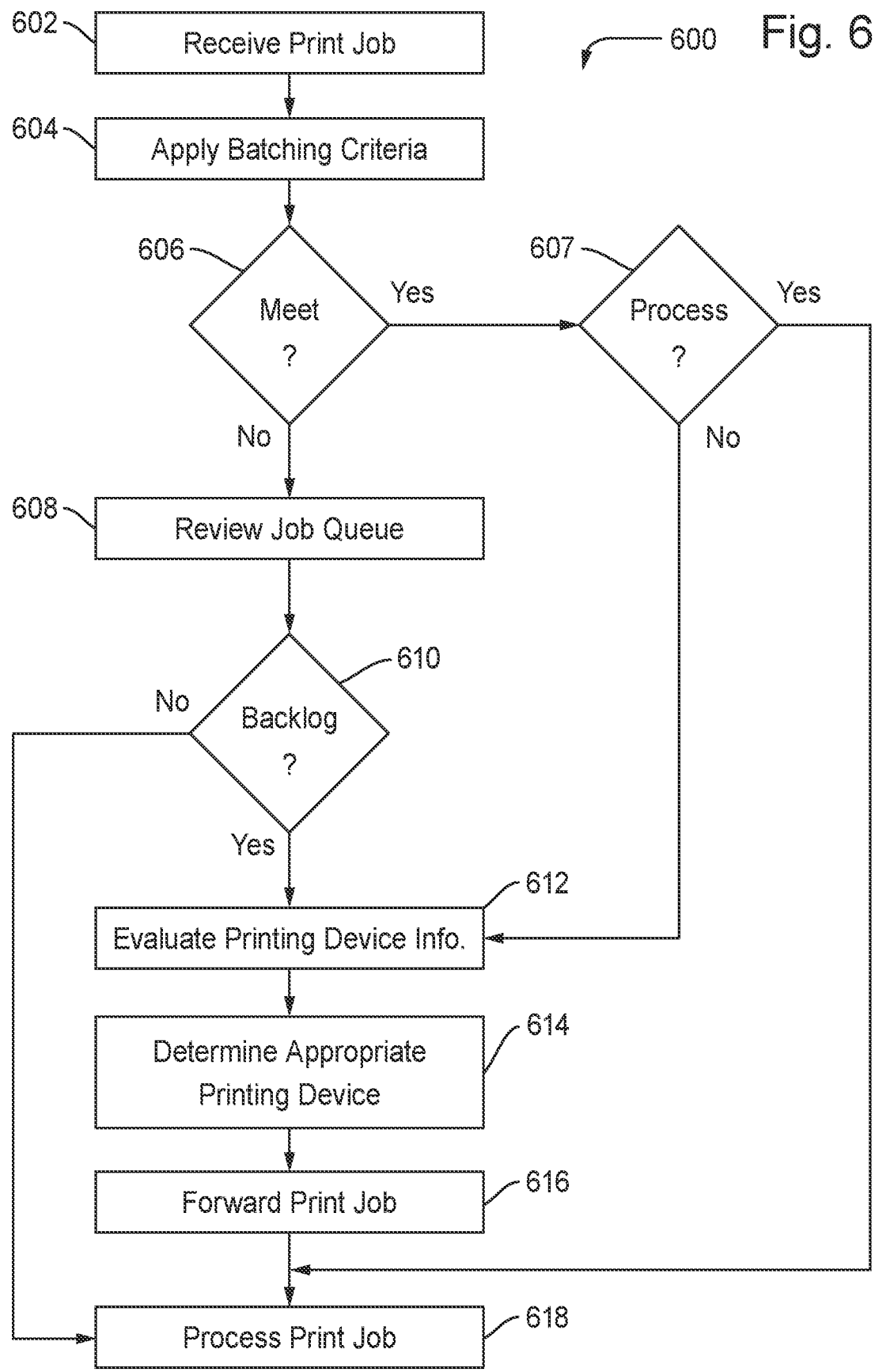
FIG. 6 illustrates a flowchart for load balancing using a peer-to-peer network according to the disclosed embodiments.

FIG. 6 depicts a flowchart 600 for load balancing using a peer-to-peer network according to the disclosed embodiments. Flowchart 600 may refer to FIGS. 1A-5 for illustrative purposes. Flowchart 600, however, is not limited by the embodiments disclosed by FIGS. 1A-5.

Step 602 executes by receiving print job 302 at first printing device 104. Print job 302 also may be received by second printing device 120 or third printing device 130, but first printing device 104 is disclosed for illustrative purposes. Print job 302 may include instructions for finishing the job, such as stapling, punching, printing on both sides, specified media, and the like. Step 604 executes by applying batching criteria 318 to these instructions to determine if any special actions need to be taken on behalf of print job 302. DFE 106 determines whether print job 302 should be printed with another batch of jobs having the same instructions.

Step 606 determines whether print job 302 meets any of batching criteria 318 specified for the peer-to-peer network. If yes, then step 607 executes by determining whether printing device 104 can process print job 302 according to the batching criteria. In other words, DFE 106 may evaluate instructions 306 to determine if there are print jobs 110 already in job queue 108 that are having the same actions taken as those specified for print job 302. For example, print job 302 may require punching operations and print job 3 in job queue also requires punching. If so, then step 607 determines that printing device 104 can process print job 302. Flowchart 600 proceeds to step 618, disclosed below.

If step 607 is no, then flowchart 600 proceeds to step 612. Step 612 is disclosed in greater detail below.

If step 606 is no, then batching criteria 318 does not apply to print job 302 and it can be printed on its own. Step 608 executes by reviewing job queue 108 for pending print jobs and time information 304 to complete the print jobs. The disclosed embodiments may take into account the number of print jobs and the time to complete the print jobs. Step 610 executes by determining whether a backlog condition exists at DFE 106. DFE 106 analyzes the status and information for job queue 108 to determine if the current situation exceeds a backlog threshold 316, disclosed above. A backlog condition may exist if there are too many print jobs 110 in job queue 108 or the time to complete the print jobs exceeds backlog threshold.

If step 610 is no, then flowchart 600 proceeds to step 618. No backlog condition exists so no further actions or processing needs to be done by DFE 106 for load balancing. If step 610 is yes, then step 612 executes by evaluating printing device information 118 regarding job queues at other printing devices in the peer-to-peer network. A backlog condition exists at DFE 106, so the disclosed embodiments will perform load balancing to forward print job 302 to a printing device that can complete printing operations in a more timely manner DFE 106 may send instruction 140 to receive updated printing device information 118 including the status and information for job queues 124 and 134.

Step 614 executes by determining an appropriate DFE in which to forward print job 302. DFE 106 may review the number of print jobs in job queue 124 of DFE 122 and job queue 134 of DFE 132. For example, job queue 124 includes two print jobs 126 having a completion time of 3 minutes according to time information 308. Job queue 134 includes three print jobs 136 having a completion time of 10 minutes according to time information 312. Thus, DFE 106 most likely will determine DFE 122 of second printing device 120 is the best choice to complete print job 302.

Step 616 executes by forwarding print job 302 to DFE 122. Another instruction 140 may be sent to the other DFEs in the peer-to-peer network to indicate this action. Step 618 executes by processing print job 302 accordingly to be printed at the respective printing criteria.

It should be noted that steps 612-618 also are executed if batching criteria 318 are applied to print job 302. DFE 106 determines a printing device that also is printing jobs that are performing the action for a batch of print jobs. DFE 106 may evaluate instructions 310 of DFE 122 and instructions 314 of DFE 132 to determine whether any pending print jobs also have the same instructions as print job 302. Using the punching example, DFE 106 may evaluate printing device information 118 and determine, using instructions 314, that print jobs 1 and 2 of print jobs 136 at DFE 132 also call for punching while printing. Instructions 310 from DFE 122 indicate that second printing device 120 is not handling any such print jobs. Thus, DFE 106 may forward print job 302 to DFE 132.

As disclosed above, flowchart 600 may be performed before any spooling occurs at DFE 106. DFE 106 may use a protocol that allows print job 302 to be submitted without sending the job file to other components within DFE 106. This feature enables low overhead output management as opposed to spooling then forwarding.

Figure 7:
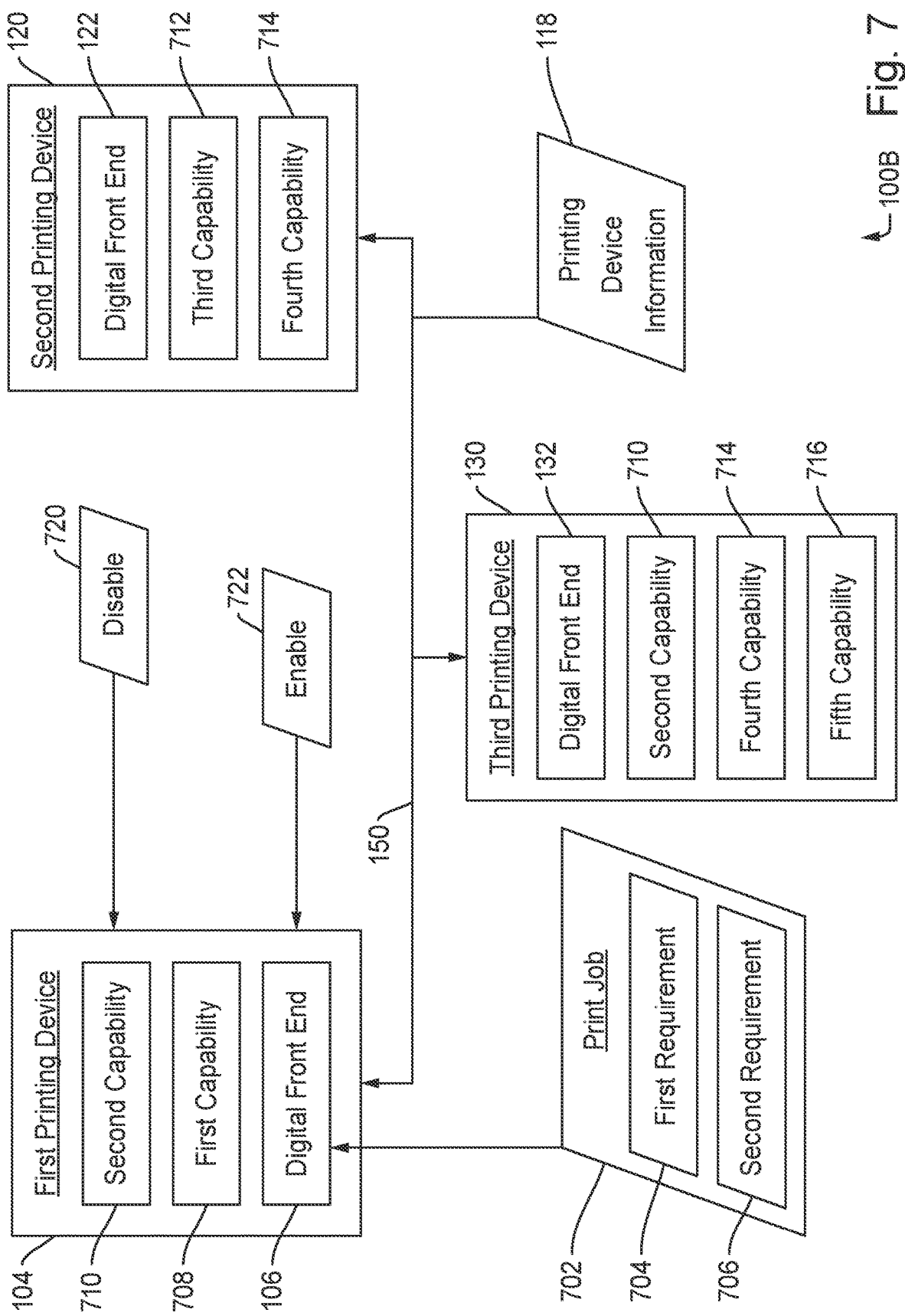
FIG. 7 illustrates a block diagram of the printing system configured into a peer-to-peer network for capability matching according to the disclosed embodiments.

FIG. 7 depicts a block diagram of printing system 100B configured into a peer-to-peer network for capability matching according to the disclosed embodiments. As with the embodiments disclosed above, system 100 includes a peer-to-peer network of first printing device 104, second printing device 120, and third printing device 130. Each printing device includes its own DFE. Further, each printing device includes various capabilities to apply when printing. These capabilities are captured in printing device information 118, as disclosed above. The peer-to-peer network may use the printing device information to match capabilities to print jobs when needed to optimize printing operations.

For example, first printing device 104 may include first capability 708 and second capability 710. Second printing device 120 may include third capability 712 and fourth capability 714. Third printing device 130 may include second capability 710, fourth capability 714, and fifth capability 716. Thus, printing devices in the peer-to-peer network may share capabilities as well as include capabilities unique to the respective printing device. The disclosed embodiments include printing devices having many capabilities, but these are shown for illustrative purposes. For example, printing device 104 may include dozens if not hundreds of capabilities.

Printing device capabilities may include different levels. One level of capabilities may be related to nominal engine capabilities, such as stapling in that the printing device has a stapler, the ability to color print, the ability to print on both sides of a paper, and the like. These capabilities may be known as intrinsic capabilities in that they will not change over time at the printing device. Another level of capabilities is related to current engine capabilities that are more transient or changeable. Such capabilities include the ability to print on paper A that is loaded onto the printing device, the ability to print using a specific font, and the like. These capabilities may change over time, such as when new paper is loaded or the fonts updated at the printing device.

For purposes of the disclosure of FIG. 7, first capability 708 and third capability 712 may be intrinsic capabilities. First capability 708 may be stapling and third capability 712 may be punching holes on printed pages. These capabilities relate to the physical capabilities available at the printing devices. The other capabilities may be extrinsic or interchangeable capabilities. Thus, second capability 710 may be color printing, fourth capability 714 may be having a specified print media available to print, and fifth capability 716 may be having paper A loaded thereon.

DFE 106 receives print job 702. DFE 106 may then evaluate the instructions for print job 702 for any requirements to complete the print job. For example, print job 702 may include first requirement 704 that the print job be printed using color printing operations and second requirement 706 that it be printed on paper A. DFE 106 determines that it cannot meet second requirement 706 so it evaluates printing device information 118 to determine which other printing device in the peer-to-peer network can fulfill the requirement. Second printing device 120 does not include a capability for color printing or to print using paper A. In contrast, third printing device 130 include second capability 710 for color printing and fifth capability 716 for printing using paper A. DFE 106 may then forward print job 702 to third printing device 130.

In another embodiment, print job 702 may include instructions that first requirement 704 be fulfilled by printing on a specific media currently loaded on the printing device. The specific media may be set forth in fourth capability 714. DFE 106 determines that first printing device 104 does not currently have the specific media available. It then retrieves and evaluates printing device information 118 to determine which printing device is best suited to receive print job 702. Second printing device 120 and third printing device 130 both include fourth capability 714. DFE 106 may send a signal requesting current device capabilities, such as backlog information, number of impressions in the job queues, and the like. DFE 106 then may decide which printing device is not suffering from a backlog condition and send print job 702 accordingly. For example, third printing device 130 may have print jobs in job queue 134 that exceed backlog threshold 316. Second printing device 120 has no print job in its job queue 124. DFE 106 then forwards print job 702 to second printing device 120.

Capability matching also may be disabled and enabled. The operator may not wish to send print jobs to other printing devices and resolve any issues at the current printing device. Thus, disable 720 may be received to prevent any forwarding of print jobs due to a lack of capability. Further, disable 720 may only relate to a single capability or a subset of capabilities available within the peer-to-peer network. For example, if print job 702 includes a requirement to print on paper A, then disable 720 may disable any forwarding related to this capability. The operator may stop and load paper A on the printing device. Enable 722 may be received to override disable 720 when the operator wishes to renew capability matching.

Figure 8:
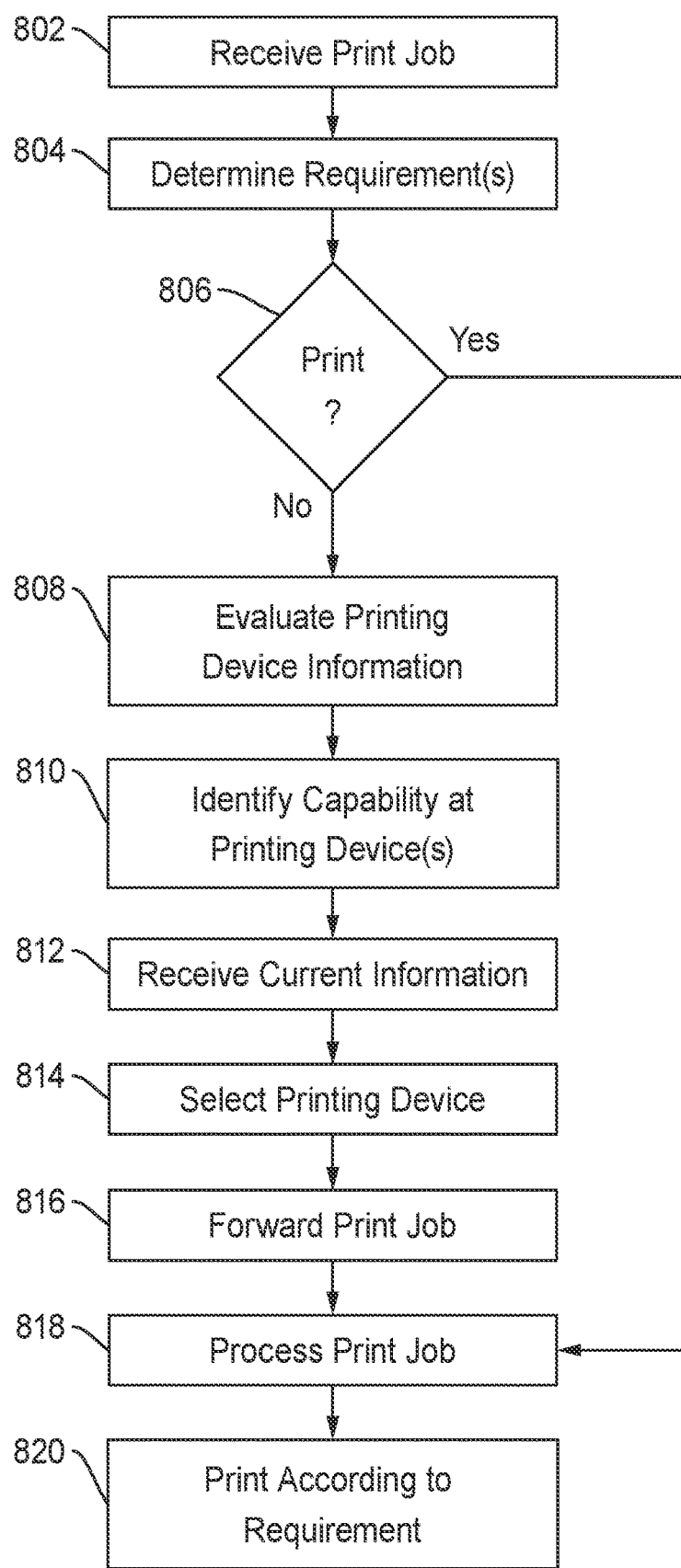
FIG. 8 illustrates a flowchart for capability matching using a peer-to-peer network according to the disclosed embodiments.

FIG. 8 depicts a flowchart 800 for capability matching in a peer-to-peer network according to the disclosed embodiments. Flowchart 800 may refer to FIGS. 1A-7 for illustrative purposes. Flowchart 800, however, is not limited by the embodiments disclosed by FIGS. 1A-7.

Step 802 executes by receiving print job 702 at DFE 106. Print job 702 also may be received at DFE 122 of second printing device 120 or DFE 132 of third printing device 130. DFE 106 may partially process print job 702. Alternatively, DFE 106 may choose not to process print job 702. These features are disclosed in greater detail. DFE 106, however, reviews instructions provided with print job 702. Step 804 executes by determining whether print job 702 includes one or more requirements to complete the print job at a printing device. For example, print job 702 may include first requirement 704 and second requirement 706 related to the printing operations to complete the print job.

Step 806 executes by determining, at DFE 106, whether first printing device 104 can complete print job 702 according to the one or more requirements. If yes, then flowchart 800 proceeds to step 818 disclosed below. Print job 702 stays at first printing device 104 and is not forward to another printing device. If step 806 is no, then step 808 executes by evaluating printing device information 118, which includes the capabilities for the printing devices within the peer-to-peer network. DFE 106 may evaluate printing device information 118 to determine that second printing device 120 includes third capability 712 and fourth capability 714 while third printing device 130 includes second capability 710, fourth capability 714, and fifth capability 716. First printing device 104 includes first capability 708 and second capability 710.

Step 810 executes by identifying the capabilities at the printing devices. As noted above, each printing device includes shared and unique capabilities to finish printing operations. DFE 106 reviews printing device information 118 to determine which printing devices include the capability to fulfill the requirement specified for print job 702 that is not available at printing device 104. For example, first requirement 704 may specify that fourth capability 714 be performed to complete print job 702. DFE 106 identifies second printing device 120 and third printing device 130 as being able to provide fourth capability 714.

Step 812 executes by receiving current information about the printing device capabilities from the respective printing devices. DFE 106 may send a signal using the subscription service to request the information from printing devices 120 and 130. This information may relate to the availability of fourth capability 714 to be completed. For example, if fourth capability 714 relates to printing print job 702 on paper A, then DFE 106 may request information for the amount of paper A available at each of printing devices 120 and 130. Alternatively, DFE 106 may request current job queue status information, as used in load balancing disclosed above. DFEs 122 and 132 returns this information to DFE 106.

Step 814 executes by selecting a printing device to receive print job 702 based on the capabilities listed in printing device information 118 as well as any information received on the current statuses at the printing devices. For example, fourth capability 714 is identified as being available at second printing device 120 and third printing device 130. Information received at DFE 106 indicates that a backlog condition exists at third printing device 130 whereas second printing device 120 is idle. Alternatively, no backlog condition exists at third printing device 130 but its information suggests that it only has 20-30 sheets available. Print job 702 may requirement 1000s of sheets of paper. Thus, third printing device 130 is not recommended and second printing device 120 selected to receive the print job.

Step 816 executes by forwarding print job 702 to the selected printing device. DFE 106 may send print job 702 directly to the other printing device. It also may forward through the partial network configuration shown in FIG. 1D in that it may go to second printing device 120 and then to third printing device 130, if applicable. Step 818 executes by processing print job 702 according to requirements 704 and 706. The receiving printing device may place print job 702 into its job queue. Step 820 executes by printing the document or documents of print job 702 according the applicable requirements. Using the above example, print job 702 is completed using paper A at third printing device 130.

Figure 9:
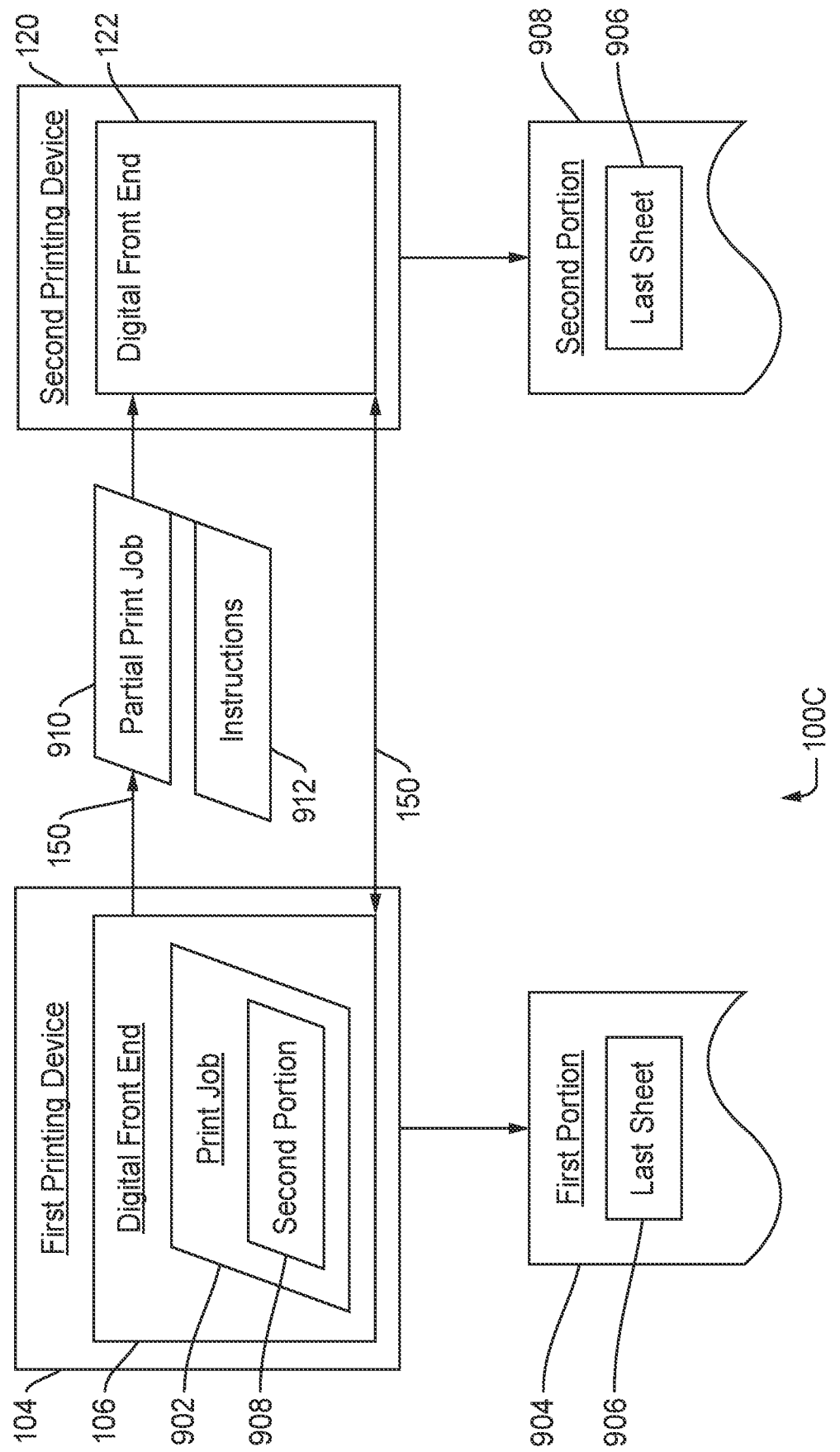
FIG. 9 illustrates a block diagram of the printing system configured into a peer-to-peer network for failover operations according to the disclosed embodiments.

FIG. 9 depicts a block diagram of printing system 100C configured into a peer-to-peer network for failover operations according to the disclosed embodiments. If a printing device has started to print a job and a problem arises, then the DFE of the printing device will forward the print job to another printing device. Before forwarding the print job, the DFE will adjust the print instructions so that the last sheet that was printed successfully is the first sheet in the second printing device. This functionality is enabled in a peer-to-peer manner.

FIG. 9 shows first printing device 104 and second printing device 120. Third printing device 130 also may be included but is not shown for brevity. Print job 902 is received at DFE 106 of printing device 104. A problem arises that cannot be resolved by the operator or normal operations. For example, print job 902 may be printed on paper A, which is not available at printing device 104. The operator is not able to load paper A onto printing device 104. Alternatively, a hardware failure occurs that cannot be resolved in a timely manner to complete the print job for the customer. Thus, the remaining portion of the print job will need to be completed elsewhere.

A restart of the print job may waste time and resources. Print job 902 may involve 1000s of pages so that it does not make sense to reprint so many pages. Thus, the disclosed embodiments provide features to send the remaining portion of the print job to another printing device without repeating operations already completed.

When the problem is detected, first printing device 104 already completed first portion 904 of print job 902. First portion 904 may be referred to as the printed portion in that pages or output already exists. The disclosed embodiments do not want to reprint this output. Second portion 908 of print job 902 refers to the remaining portion that is not printed. Second portion 908 is already processed within engine 260 and is ready to print. Second portion 908 will be forwarded to another printing device, such as second printing device 120, as partial print job 910. In some embodiments, print job 902 is sent as partial print job 910 but with print instructions 912 to instruct second printing device 120 on how to print the document(s) within print job 902. Thus, although referred to as partial print job 910 for illustrative purposes, print job 902 is actually sent to second printing device 120.

Before forwarding partial print job 910, DFE 106 will adjust instructions 912 so that last sheet 906 printed successfully with first portion 904 is the first sheet printed with second portion 908 as second printing device 120. As shown, last sheet 906 is printed with first portion 904 and second portion 908. The disclosed embodiments may match the portions using last sheet 906. Print job 902 is printed completely with a minimum of repeated pages.

Last sheet 906 also may be known as the failover boundary according to the disclosed embodiments. The failover boundary may be dynamically determined based on the print ticketing instructions for print job 902. In other words, it may not make much sense to use a "last page" as the boundary for starting second portion 908. Thus, in some instances, for print jobs not finished together, the failover boundary will happen at the last good sheet, as shown in FIG. 9. The first sheet for print job 902 in the failover printing device, or second printing device 120, will be the last good sheet printed with first portion 904 at first printing device 104.

For print jobs that are finished together, the failover boundary may be at the copy last printed with first portion 904. In other words, print job 902 includes 100s of copies of a document having several pages. First portion 904 includes a partial print of the document. It may not make sense to restart using a last sheet as the failover boundary. Print job 902 at second printing device 120 will start at the first page of the copy that was not finished. Thus, last sheet 906 may refer to a last copy.

For print jobs that use subset finishing, the failover boundary may be the last good sheet if the sheet is not part of the subset of pages that are finished together. Alternatively, the failover boundary may be the first page of currently printing subset portion of print job 902. For example, print job 902 may include subsets that are finished together. The disclosed embodiments account for this using the dynamic determination for instructions 912. For print jobs that include tab sheets, second printing device 120 may purge tabs until the next tab in the feeder matches the next required tab for the forwarded print job.

The disclosed embodiments also may use load balancing or capability matching, as disclosed above, in selected the printing device to receive the forwarded print job. For example, second printing device 120 may include a capability needed to print second portion 908. DFE 106 evaluates printing device information 118 to determine to forward partial print job 910. In other embodiments, third printing device 130 may have a backlog condition and is not able to complete printing the remaining portion according to a deadline. Second printing device 120 is idle and can complete the remaining portion so that partial print job 910 is forwarded thereto.

Figure 10:
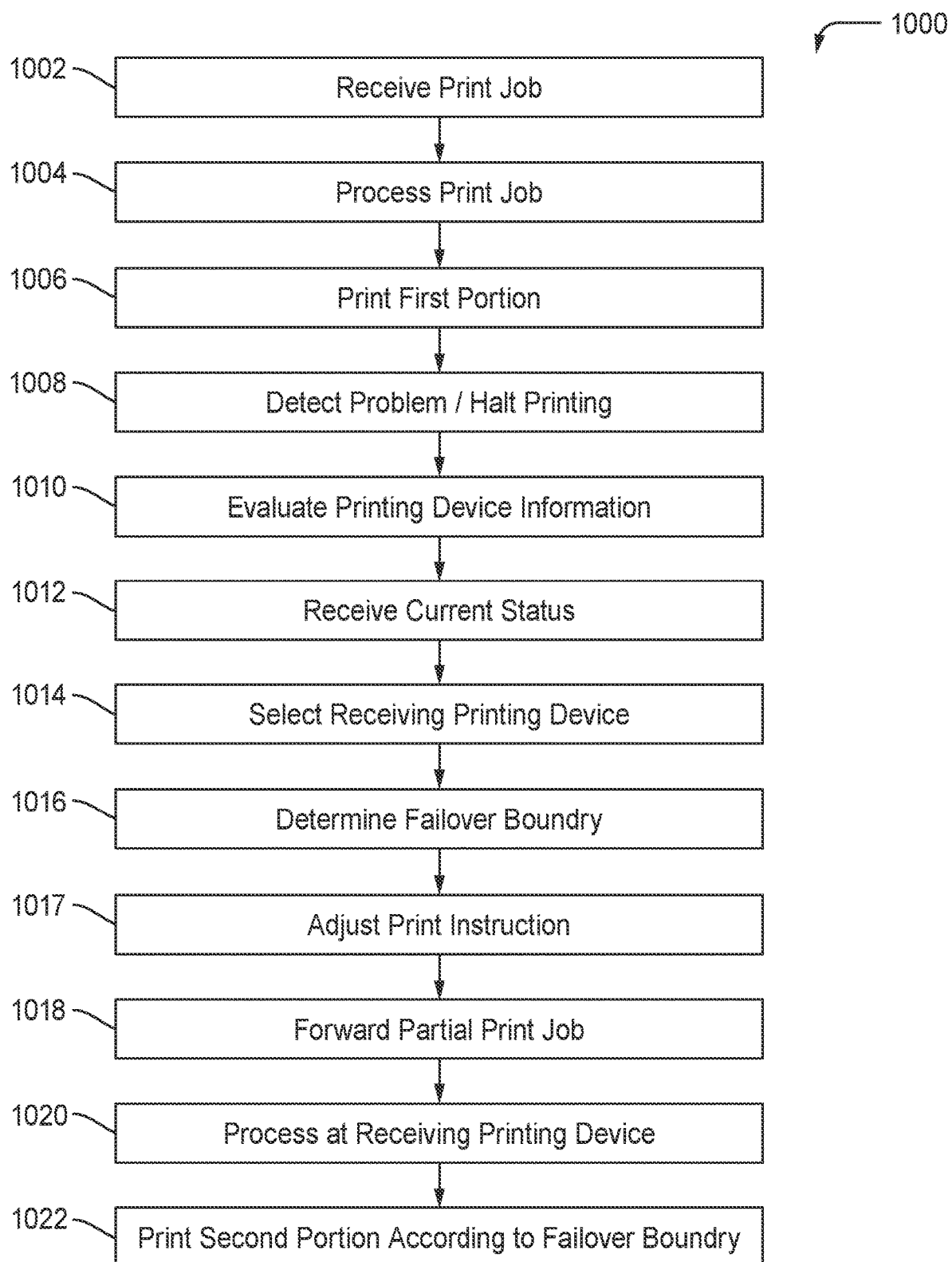
FIG. 10 illustrates a flowchart for failover operations using a peer-to-peer network according to the disclosed embodiments.

FIG. 10 illustrates a flowchart 1000 for failover operations using a peer-to-peer network according to the disclosed embodiments. Flowchart 1000 may refer to FIGS. 1A-9 for illustrative purposes. Flowchart 1000, however, is not limited by the embodiments disclosed by FIGS. 1A-9.

Step 1002 executes by receiving print job 902 at DFE 106 of first printing device 104. Print job 902 may include requirements, as disclosed above, such as stapling, color printing, and the like. Step 1004 executes by processing print job 902 at DFE 106. Processing may include being placed in the job queue, RIP processing, and the like. In other words, print job 902 is treated like a normal print job by DFE 106 and first printing device 104. Step 1006 executes by printing first portion 904 of print job 902. First portion 904 may represent the pages or copies printed at first printing device 104.

Step 1008 executes by detecting a problem with printing print job 902 by DFE 106. Step 1008 also may include halting the printing of print job 902 for any reason. The problem may not be resolved by the operator. Thus, the remaining portion to be printed will need to be done on another printing device separate from first printing device 104. First portion 904 is printed and the disclosed embodiments do not want to redo these pages of the print job. This feature is important for large print jobs having 1000s of pages.

Step 1010 executes by evaluating printing device information 118. Printing device information 118, as disclosed above, includes capabilities and other information regarding the printing devices connected via connection 150 in the peer-to-peer network with first printing device 104. DFE 106 may determine which printing devices can meet the requirements set forth by print job 902, if applicable. Step 1012 executes by receiving the current status from connected printing devices. Such status may include backlog information or other information about the number of print jobs or impressions remaining to processed, time to complete the backlog, and the like.

Step 1014 executes by selecting a receiving printing device to complete printing the print job. For example, DFE 106 may select second printing device 120 based on its capabilities and other factors. Step 1016 executes by determining a failover boundary at which to resume printing print job 902 at second printing device 120. For example, the failover boundary may be last sheet 906 printed by first portion 904. Last sheet 906 may be the last properly printed page at first printing device 104. Last sheet 906, therefore, will be the first sheet printed with second portion 908 at second printing device 120. As disclosed above, the failover boundary may be other items, such as the first page of an unfinished copy, the first page of unfinished subset portion, and the like.

Step 1017 executes by adjusting print instructions 912 for print job 902 to generate partial print job 910. Partial print job 910 is shown for illustrative purposes and is print job 902 with instructions 912. In other words, print job 902 is sent to second printing device 120 but this feature is shown as partial print job 910 in FIG. 9 to distinguish it from the print job remaining at DFE 106. Step 1018 executes by forwarding partial print job 910 and instructions 912 to second printing device 120.

Step 1020 executes by processing partial print job 910 at second printing device. DFE 122 may not have to repeat the printing processing operations but partial print job 910 may be placed in job queue 124 of second printing device 120. DFE 122 also processes instructions 912 to determine the failover boundary to start printing partial print job 910. Step 1022 executes by printing second portion 908 of print job 902 at second printing device 120 according to the failover boundary. For example, last sheet 906 is printed at the first sheet for second portion 908. Thus, all the pages or sheets of print job 902 are printed without needless delay as well as making sure all copies are printed. The failover operations are completed in a peer-to-peer manner between the DFEs connected in the network.

Figure 11A:
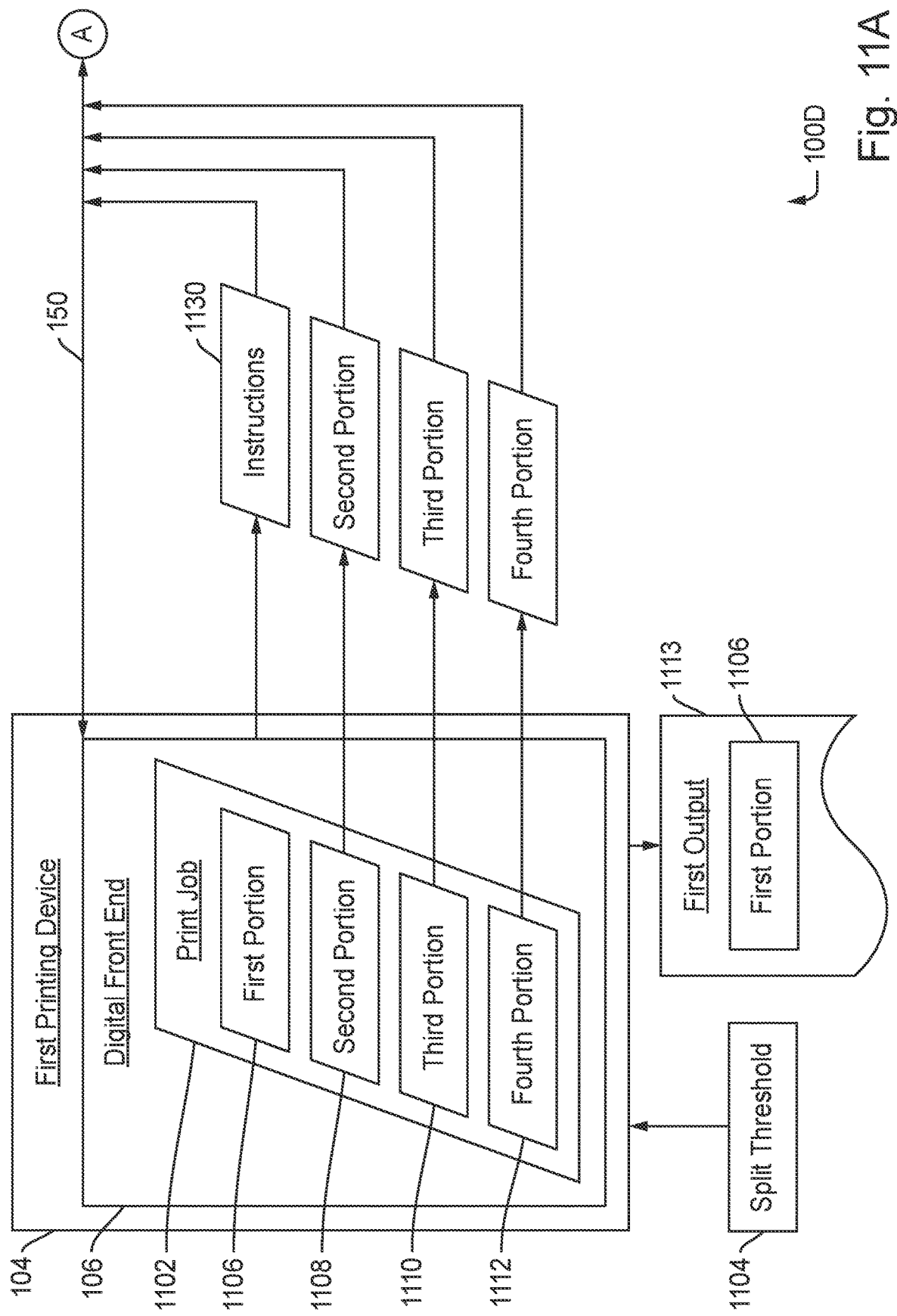
FIG. 11A illustrates a block diagram of the printing system configured into a peer-to-peer network for print splitting according to the disclosed embodiments.
Figure 11B:
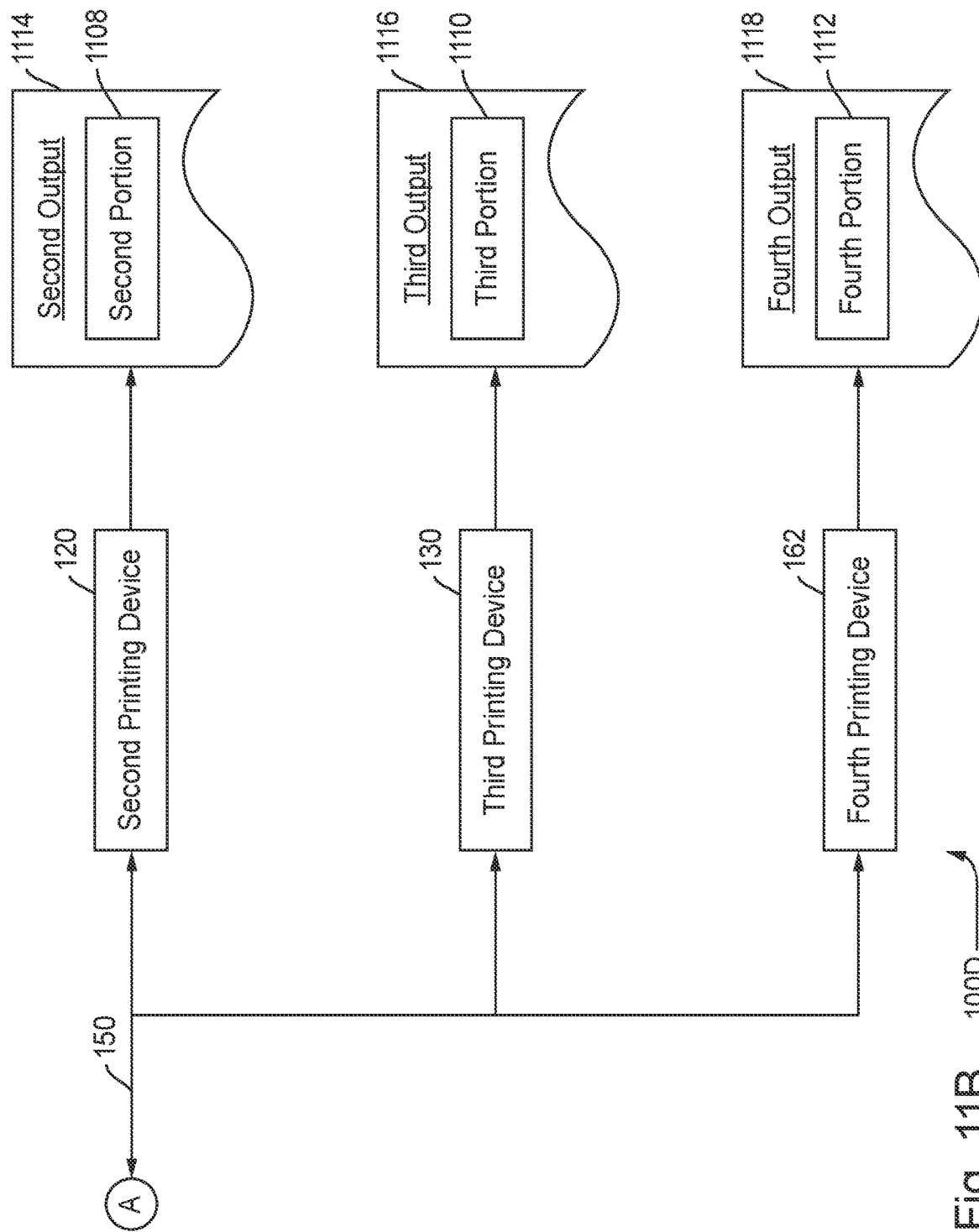
FIG. 11B also illustrates a block diagram of the printing system configured into a peer-to-peer network for print splitting according to the disclosed embodiments.

FIG. 11 depicts a block diagram of printing system 100D configured into a peer-to-peer network for print splitting according to the disclosed embodiments. The peer-to-peer network shown in FIG. 11 includes first printing device 104, second printing device 120, third printing device 130, and fourth printing device 162. Additional printing devices may be configured with the peer-to-peer network but not shown for brevity.

If printing device 104 receives a print job that exceeds the split threshold or thresholds, then the disclosed embodiments will split the print job between the plurality of printing devices within the peer-to-peer network. Split threshold 1104 may represent one or more split thresholds used by the peer-to-peer network to determine when to invoke color splitting operations. Split threshold 1104 may be the number of pages, number of copies, number of records, such as VDP records, print quantity above a certain threshold, and the like. If a print job exceeds split threshold 1104 then a split threshold condition exists and splitting operations are enabled.

Print job 1102 is received by first printing device 104 at DFE 106. If a split threshold condition exists based on split threshold 1104, then print job 1102 is split between the printing devices connected to DFE 106 in the peer-to-peer network. In this instance, three additional printing devices are within the peer-to-peer network. Print job 1102 may be partitioned into four portions, or first portion 1106, second portion 1108, third portion 1110, and fourth portion 1112 corresponding to the four printing devices within the peer-to-peer network.

DFE 106 forwards a portion of print job 1102 to a respective printing device for completion of print job 1102. Thus, first portion 1106 may stay with DFE 106 of printing device 104. Second portion 1108 is forwarded to DFE 122 of second printing device 120. Third portion 1110 is forwarded to DFE 132 of third printing device 130. Fourth portion 1112 is forwarded to the DFE of fourth printing device 162. In some embodiments, DFE 106 may send print job 1102 itself to the different printing devices but adjust printing instructions for the print job to only print the pages or sheets for the respective portion. This feature may reduce the load on performing color splitting operations and not require operator intervention.

Once a portion is received at the corresponding printing device, that portion is printed thereon. According to the disclosed embodiments, print job 1102 is divided into portions that are acceptable for the printing devices in the peer-to-peer network. If split threshold 1104 indicates that only 2000 pages may be printed at a printing device within the peer-to-peer network and print job 1102 is 7500 pages, then all 7500 pages will be printed by at different printing devices in order to meet the split threshold requirement.

DFE 106 receives print job 1102 and determines that it is 7500 pages. Split threshold 1104 is 2000 pages. This page limit may be related to tray sizes or other features at the printing devices. Alternatively, the split threshold may be related to distributing use as needed within the peer-to-peer network so that one printing device is not tied up while another printing device sits idle. It also may be related to maintenance on the printing devices and managing use, potential breakdowns, paper jams, etc.

Using this example, first portion 1106 may be pages 1-2000 and printed at first printing device 104 as first output 1113. First output includes pages 1-2000. Second portion 1108 may be pages 2001-4000 and printed at second printing device 120 as second output 1114. Second output includes pages 2001-4000. Third portion 1110 may be pages 4001-6000 and printed at third printing device 130 as third output 1116. Third output includes pages 4001-6000. Fourth portion 1112 may be pages 6001-7500 and printed at fourth printing device 162 as fourth output 1118. Fourth output 1118 includes pages 6001-7500. The operator may retrieve first output 1113, second output 1114, third output 1116, and fourth output 1118 to complete the whole of print job 1102. Preferably, pages or copies are not repeated in the portions so that the split printing is efficient and optimized. It also is handled in a peer-to-peer manner.

In some embodiments, pages may not be split, but a number of copies may be split. Print job 1102 may call for a number of copies to be printed, such as 2000 copies of a document. In this instance, split threshold 1104 may relate to the number of copies that may be printed at a printing device before a split condition occurs. Using an example, split threshold 1104 may be 600 copies. DFE 106 may split print job 1102 into the four portions as evenly as possible given that 600 copies does not fit neatly with a requirement of 2000. Thus, each portion may be 500 copies despite the split threshold being 600 copies. First portion 1106 includes copies 1-500, second portion 1108 includes copies 501-1000, third portion 1110 includes copies 1001-1500, and fourth portion 1112 includes copies 1501-2000. These copies may be printed at the respective outputs at the connected printing devices.

The same process may be used for a print job having a number of records, which are not copies, but also are not just pages. If print job 1102 includes 3000 records, such as personnel records of a large company, then a split threshold of 1000 records would give rise to a split threshold condition and printing of the records would be split between the printing devices, as disclosed above. Each portion may include 750 records to print at the respective printing device. Again, the split printing operations are handled in a peer-to-peer manner.

The splitting operations may be further enhanced with load balancing and capability matching operations, as disclosed above. For example, second printing device 120 may not have a stapler. Print job 1102 requires its copies to be stapled. DFE 106, therefore, may divide print job 1102 into a portions to be received by a subset of printing devices within the peer-to-peer network. DFE 106 evaluates printing device information 118 to determine which printing devices may receive portions of print job 1102 and forwards them to the subset of printing devices accordingly. This features reduces waste and the potential for incomplete print jobs.

The disclosed embodiments also may enable color printing splitting. Color printing splitting is similar to that embodiments disclosed above except that the pages are divided to that color pages go to an applicable printing device and monochrome (black/white or grayscale) pages go to another printing device. The print instructions for one of the printing devices optionally adjusted so that the pages from the other printing device are inserted into the receiving printing device.

Referring back to FIG. 11, first printing device 104 and second printing device 120 may be color printing devices while third printing device 130 and fourth printing device 162 are monochrome (non-color) printing devices. Print job 1102 may have pages that require color printing so that the print job may not be split using the embodiments disclosed above. DFE 106 may split print job 1102 so that first portion 1106 and second portion 1108 includes the color printing pages and processed then printed at a printing device having a color capability. Third portion 1110 and fourth 1112 are sent to monochrome printing devices 130 and 162 and do not include any pages requiring color printing. DFE 106 also sends instructions 1130 to the printing devices. Instructions 1130 may be adjusted so that pages are inserted together with the color pages to complete print job 1102.

FIG. 12 depicts a flowchart 1200 for print splitting in a peer-to-peer network according to the disclosed embodiments. Flowchart 1200 may refer to FIGS. 1A-11 for illustrative purposes. Flowchart 1200, however, is not limited by the embodiments disclosed by FIGS. 1A-11.

Step 1202 executes by receiving print job 1102 at DFE 106 of printing device 104. Step 1204 executes by analyzing print job 1102. Specifically, DFE 106 analyzes print job 1102 regarding a parameter of interest, such as number of pages in the print job, the number of copies, the number of records, and the like. The parameter should relate to a "size" of print job 1102 in that a certain amount of resources is needed to print the job or a certain amount of time is needed to complete printing operations.

Step 1206 executes by applying split threshold 1104. Split threshold 1104 corresponds to a limit for a printing device within the peer-to-peer network on printing operations. For example, the number of pages or number of copies printed at first printing device 104 may be limited to some threshold. For example, split threshold 1104 may define a page limit of 500 pages for a print job to be completed at a printing device.

Step 1207 executes by determining whether print job 1102 passes the application of split threshold 1104. If yes, then step 1208 executes by printing print job 1102 at first printing device 104. For example, print job 1102 may print 356 pages, which is below split threshold 1104 of 500 pages. A split threshold condition does not exist.

If step 1207 is no, then step 1209 executes by determining a split threshold condition exists within DFE 106 for print job 1102. Using the example, print job 1102 may be 1800 pages, which exceeds the printing capability of first printing device 104. Thus, portions of print job 1102 will need to be printed at one or more printing devices connected to DFE 106 in the peer-to-peer network. Step 1210 executes by evaluating printing device information 118 in printing capabilities for the other connected printing devices. The use of printing capabilities is disclosed above. Further, DFE 106 may request status information for the printing devices to determine whether a backlog condition exists at any of them.

Step 1212 executes by determining a set of printing devices available to split print job 1102. In some embodiments, all connected printing devices may be used for the split printing operations. In other embodiments, a subset of the printing devices may be selected based on availability and capability at the printing devices. This feature may be needed if color printing is needed for portions of print job 1102 and not every printing device is a color printing device.

Step 1214 executes by splitting print job 1102 into portions, as disclosed above. Referring to FIG. 11, print job 1102 may be split into four portions to be distributed between four printing devices. How print job 1102 is split may be due to the nature of the print job and whether the split threshold relates to the number of pages, number of copies, number of records, and the like. The splitting operations are disclosed above. Step 1216 executes by adjusting printing instructions 1130 that are sent with the portions of the print job. For example, printing instructions 1130 may include instructions on how to place color pages back with black and white page printed at other printing devices. Instructions 1130 also may dictate which portion of print job 1102 is to be handed at the receiving printing device in that the print job is not "split up" but received at each printing device, which prints its portion according to the instructions.

Step 1218 executes by forwarding the portions to the respective printing devices. As shown in FIG. 11, second portion 1108 is forwarded to second printing device 120, third portion 1110 is forwarded to third printing device 130, and fourth portion 1112 is forwarded to fourth printing device 162 along with applicable instructions 1130. Step 1220 executes by printing the portions are the printing devices. Thus, first output 1113 for first portion 1106 is printed at first printing device 104. Second output 1114 for second portion 1108 is printed at second printing device 120. Third output 1116 for third portion 1110 is printed at third printing device 130. Fourth output 1118 for fourth portion 1112 is printed at fourth printing device 162. First output 1113, second output 1114, third output 1116, and fourth output 1118 may then be combined to complete the printed print job. All these processes are completed in a peer-to-peer manner.

Figure 13:
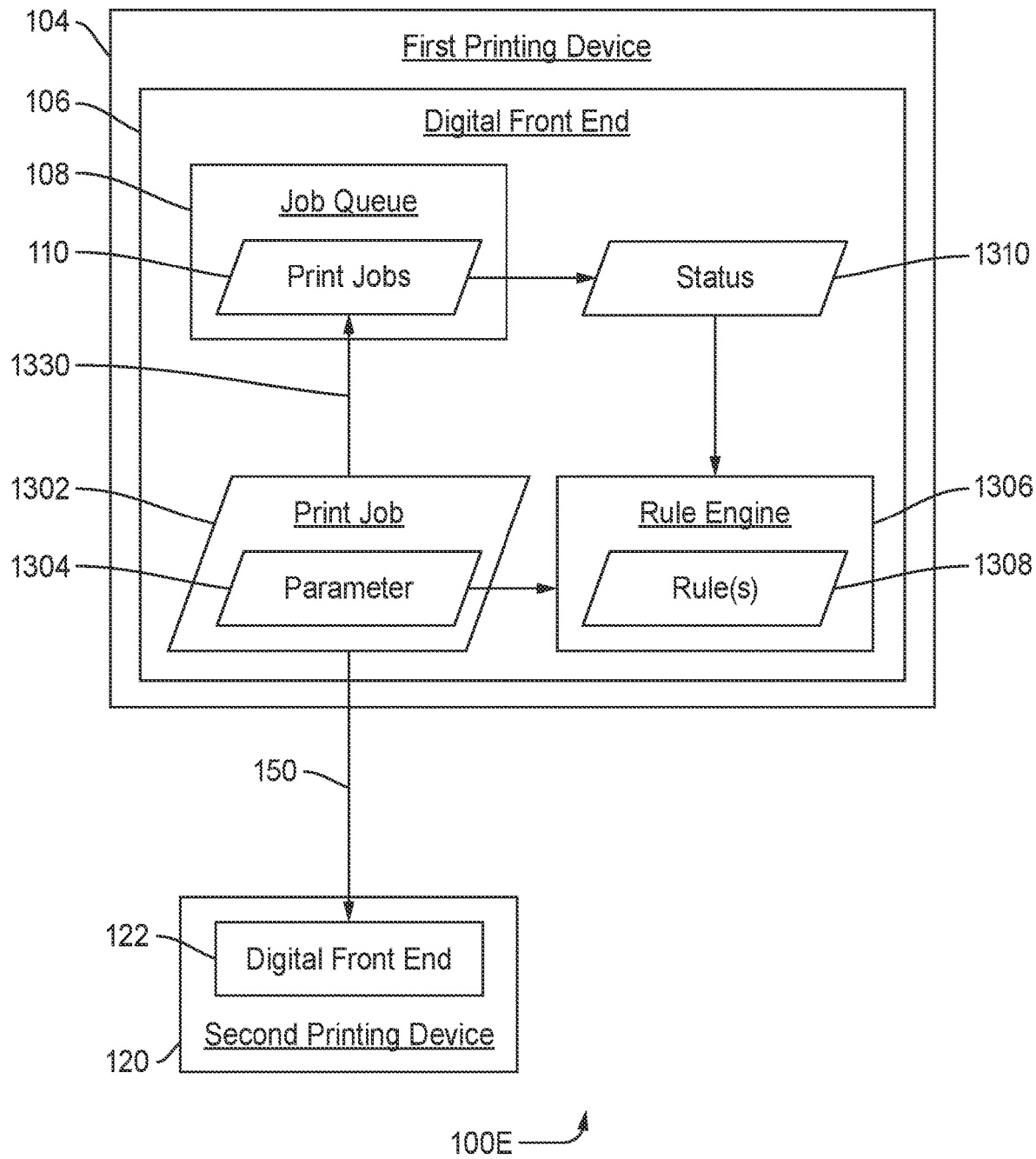
FIG. 13 illustrates a block diagram of the first printing device applying a rule in managing printing operations according to the disclosed embodiments.

FIG. 13 depicts a block diagram of first printing device 104 applying a rule 1308 in managing printing operations in a printing system 100E according to the disclosed embodiments. DFE 106 may not want to necessarily download a print job for processing if it is going to be referred out to another printing device within the peer-to-peer network. Unlike systems with an output management server, a DFE receiving a print job may tasked with doing some operations, which can tie up resources. The disclosed embodiments seek to avoid tying up resources within the DFE processing a print job that will not be printed thereon.

Thus, the DFE may queue the print jobs but defer downloading of the job files until a later time. This feature may not waste resources downloading files that may end up being forwarded to another printing device. In this instance, the peer-to-peer network may have rules about when to download the job files. Downloading of the job files when the print job is ready to print may not be reasonable because the download may take longer than anticipated or there may a problem with the download.

Thus, the disclosed embodiments may have rules about when to download a print job. These rules may be related to how far the job queue that the job is. Alternatively, the rules may be related to the number of impressions ahead of the print job or the print time ahead of the print job. If the print job is within a certain threshold of being printed, such as 30 minutes or 5 print jobs, then the DFE may schedule the print job for downloading and printing at that printing device. If the print job is outside that threshold, then it may be forwarded to another printing device.

First printing device 104 is shown with DFE 106 including job queue 108 having print jobs 110 as disclosed above. Print job 1302 is received at DFE 106. Print job 1302 may have certain parameters associated with it, such as a number of pages, a number of copies, a number of records, and the like. It also may have a size which corresponds to a time to complete the print job at the printing device. For example, print job 1302 may include 4000 pages and first printing device is able to print at 200 pages per minute.

DFE 106 does not want to download print job 1302 if a backlog or other condition exists that will prevent it from being printed in a timely manner DFE 106, however, does not want to wait to download the job file for print job 1302 when it is ready to print. Thus, rule engine 1306 may be implemented to apply one or more rules 1308 to print job 1302 to determine whether to download it or not to DFE 106.

Rules 1308 may set thresholds when to look at other printing devices for possible load balancing, capability matching, and so on. The thresholds may be related to the number of print jobs 110 within job queue 108. Rules 1308 may state that if the time to process the print jobs is less than 30 minutes then download print job 1302. If it is greater than 30 minutes, then do not download print job 1302 until DFE 106 makes a decision how to handle the print job. In other words, DFE 106 may not make decisions regarding transferring print jobs upon receipt. It may tentatively place them in job queue 108. DFE 106 will not pull resources except, for example, a Job Messaging Format (JMF) file or Job Definition Format (JDF) to mark its location in the job queue. The disclosed embodiments may download both the JMF file, which is used for submission, and the JDF file, which contains the print instructions and information such as the number of pages in the print job. Both files are relatively small so there is little downside to downloading them to DFE 106.

At some point during printing operations, DFE 106 will decide whether to download the resources for print job 1302. Rule engine 1306 obtains a status 1310 related to job queue 108, such as the number of print jobs, pages, impressions, and the like, remaining. Rule engine 1306 applies rules 1308 to status 1310 to determine how to handle print job 1302. Rule engine 1306 also may take into account parameter 1304 of print job 1302. The parameter may relate to the size, number of pages, number of copies, number of records, and the like for print job 1302. Status 1310 may dictate what parameter 1304 to define from print job 1302. For example, if status 1310 relates to the number of impressions remaining in job queue 108, then parameter 1304 may be the number of impressions to complete print job 1302.

Rule engine 1306 evaluates these features. If it determines that print job 1302 should be referred out, then the print job is not downloaded and sent to another printing device over connection 150. For example, print job 1302 may be sent to DFE 122 of second printing device 120 to be downloaded thereon. The processes for accomplishing this action are disclosed above. If print job 1302 should not be referred out, then download 1330 occurs at DFE 106 to print the print job at first printing device 104.

Even if there is a backlog condition at first printing device 104, the disclosed embodiments defer the decision to download in order to let the backlog condition to clear out. Backlog threshold 316 is separate from any thresholds applied by rules 1308. For example, DFE 106 may determine a backlog condition exists based on backlog threshold 316. For example, the number of print jobs may exceed the backlog threshold. Receipt of print job 1302, however, may prompt an analysis using rule engine 1306 which applies rules 1308 including one stating that if the number of impressions remaining in job queue 108 is below a rule threshold, then the print job is downloaded at DFE 106. Further, DFE 106 may still refer to second printing device 120 based some other criteria, such as a failover condition, splitting operations, capability matching, and the like.

FIG. 14 illustrates a flowchart 1400 for applying a rule 1308 in managing printing operations according to the disclosed embodiments. Flowchart 1400 may refer to FIGS. 1A-13 for illustrative purposes. Flowchart 1400, however, is not limited by the embodiments disclosed by FIGS. 1A-13.

Step 1402 executes by receiving print job 1302 at DFE 106 of first printing device 104. Step 1404 executes by determining a parameter 1304 for print job 1302 in a view of status 1310 of job queue 108. Step 1406 executes by determining status 1310 of job queue 108. For example, parameter 1304 may relate to the number of impressions to be made by print job 1302. Status 1310 may relate to the number of impressions to be printed for print jobs 110 in job queue 108. For example, status 1310 may define 1200 impressions to be printed before print job 1302 starts printing.

Step 1408 executes by applying a rule of rules 1308 to determine whether to download print job 1302 to job queue 108. The rule includes a threshold related to the status and parameter. For example, the rule should relate to the number of impressions to print for pending print jobs and print job 1302. Rule 1308 may be identified by status 1310 being used to determine whether to defer print job 1302. Step 1409 executes by updating status 1310, if applicable, for job queue 108. As some time may pass between receiving print job 1302 and determining how to treat the print job, the disclosed embodiments may update status 1310 to reflect any changes during that period of time.

Step 1410 executes by evaluating status 1310 of job queue 108 in view of the threshold set forth by rule 1308. Step 1412 executes by determining whether the evaluation indicates that status 1310 passes the application of rule 1308 and any corresponding threshold. For example, if rule 1308 is to refer out print jobs when job queue has more than 1200 impressions to be printed, then status 1310 will be evaluated to determine if it is above that threshold. If step 1412 is yes, then the evaluation passes the application of rule 1308 and print job 1302 is downloaded to DFE 106. If step 1412 is no, then the evaluation does not pass the application of rule 1308 and print job 1302 is forward to another printing device. These processes are done in a peer-to-peer manner.

Thus, output management may be configured between a plurality of printing devices in a peer-to-peer network without the need for an output management server or other centralized management. The DFEs form the peer-to-peer network and resolve any issues based on the disclosed embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing printing operations, the method comprising:
    connecting a digital front end (DFE) of a second printing device to a DFE of a first printing device to form a peer-to-peer network;
    exchanging printing device information for the first printing device and the second printing device between the DFE of the first printing device and the DFE of the second printing device;
    generating a printing device information data file including the printing device information for the first printing device and the printing device information for the second printing device;
    storing the printing device information data file at the DFE of the first printing device and the DFE of the second printing device;
    detecting a change in the printing device information by the DFE of the first printing device;
    sending an instruction from the DFE of the first printing device to the DFE of the second printing device regarding the change in the printing device information; and
    modifying an action within the DFE of the second printing device in response to the change indicated by the instruction received from the DFE of the first printing device.

2. The method of claim 1, wherein the printing device information includes printing device configuration information for the respective first printing device or second printing device.

3. The method of claim 1, wherein the printing device information includes printing device resource information for the respective first printing device or second printing device.

4. The method of claim 3, wherein the printing device resource information includes at least one input tray or at least one output tray available at the respective first printing device or second printing device.

5. The method of claim 3, wherein the printing device resource information includes a paper catalog, toner levels, or ink levels available at the respective first printing device or second printing device.

6. The method of claim 3, wherein the printing device resource information includes available disk or memory space available at the respective first printing device or second printing device.

7. The method of claim 1, wherein the printing device information includes a number of print jobs at the respective first printing device or second printing device.

8. The method of claim 7, wherein the printing device information includes print instructions or a print status for each of the number of print jobs.

9. The method of claim 7, wherein the printing device information includes ticketing information or an estimated print time for each of the number of print jobs.

10. The method of claim 1, further comprising sharing the printing device information data file between the first printing device and the second printing device.

11. A printing system comprising:
    a processor; and
    a memory coupled to the processor, wherein the memory stores instructions that, when executed on the processor, configures the printing system to
    connect a digital front end (DFE) of a second printing device to a DFE of a first printing device to form a peer-to-peer network;
    exchange printing device information for the first printing device and the second printing device between the DFE of the first printing device and the DFE of the second printing device;
    generate a printing device information data file including the printing device information for the first printing device and the printing device information for the second printing device;
    store the printing device information data file at the DFE of the first printing device and the DFE of the second printing device;
    detect a change in the printing device information by the DFE of the first printing device;
    send an instruction from the DFE of the first printing device to the DFE of the second printing device regarding the change in the printing device information; and
    modify an action within the DFE of the second printing device in response to the change indicated by the instruction received from the DFE of the first printing device.

12. A computer readable storage medium having data stored therein representing software executable by a processor, the software including instructions to
    connect a digital front end (DFE) of a second printing device to a DFE of a first printing device to form a peer-to-peer network;
    exchange printing device information for the first printing device and the second printing device between the DFE of the first printing device and the DFE of the second printing device;
    generate a printing device information data file including the printing device information for the first printing device and the printing device information for the second printing device;
    store the printing device information data file at the DFE of the first printing device and the DFE of the second printing device;
    detect a change in the printing device information by the DFE of the first printing device;

send an instruction from the DFE of the first printing device to the DFE of the second printing device regarding the change in the printing device information; and
modify an action within the DFE of the second printing device in response to the change indicated by the instruction received from the DFE of the first printing device.

* * * * *